(12) United States Patent
Tsuchimoto

(10) Patent No.: US 11,451,751 B2
(45) Date of Patent: Sep. 20, 2022

(54) SOLID-STATE IMAGE PICKUP DEVICE AND IMAGE PICKUP DEVICE

(71) Applicant: SONY SEMICONDUCTOR SOLUTIONS CORPORATION, Kanagawa (JP)

(72) Inventor: Koya Tsuchimoto, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/276,426

(22) PCT Filed: Sep. 11, 2019

(86) PCT No.: PCT/JP2019/035649
§ 371 (c)(1),
(2) Date: Mar. 15, 2021

(87) PCT Pub. No.: WO2020/071068
PCT Pub. Date: Apr. 9, 2020

(65) Prior Publication Data
US 2022/0038662 A1 Feb. 3, 2022

(30) Foreign Application Priority Data

Oct. 2, 2018 (JP) .............................. JP2018-187784

(51) Int. Cl.
*H04N 5/225* (2006.01)
*H04N 9/04* (2006.01)
(Continued)

(52) U.S. Cl.
CPC ....... *H04N 9/04511* (2018.08); *H04N 5/3452* (2013.01); *H04N 5/3454* (2013.01);
(Continued)

(58) Field of Classification Search
None
See application file for complete search history.

(56) References Cited

U.S. PATENT DOCUMENTS

2011/0058038 A1* 3/2011 Twede ............... H04N 9/04557
348/148
2014/0009648 A1* 1/2014 Kim ..................... H04N 5/3696
348/272
(Continued)

FOREIGN PATENT DOCUMENTS

EP 0893705 A2 1/1999
JP 2016533140 A 10/2016

OTHER PUBLICATIONS

International Search Report and Written Opinion prepared by the European Patent Office dated Nov. 7, 2019, for International Application No. PCT/JP2019/035649.
Increasing of optical resolution of photos.
Neuromoropnic vision sensing ana processing.
(Continued)

*Primary Examiner* — Twyler L Haskins
*Assistant Examiner* — Dwight Alex C Tejano
(74) *Attorney, Agent, or Firm* — Sheridan Ross P.C.

(57) ABSTRACT

To acquire a color image. A solid-state image pickup device according to an embodiment includes a plurality of light receiving portions, each of which receives light of a specific wavelength to generate an electric charge corresponding to an amount of the received light, a detector that detects a photoelectric current based on an electric charge generated in at least one of the plurality of light receiving portions, a generator that generates a voltage signal based on the electric charge generated in each of the plurality of light receiving portions, and a driving circuit that causes the generator to generate voltage signals based on electric charges generated in at least two of the plurality of light
(Continued)

receiving portions, respectively, on the basis of a detection result of the photoelectric current by the detector.

17 Claims, 20 Drawing Sheets

(51) Int. Cl.
*H04N 5/369* (2011.01)
*H04N 5/345* (2011.01)
*H04N 5/3745* (2011.01)

(52) U.S. Cl.
CPC ........... *H04N 5/379* (2018.08); *H04N 5/3745* (2013.01); *H04N 9/04557* (2018.08)

(56) References Cited

U.S. PATENT DOCUMENTS

| | | | |
|---|---|---|---|
| 2014/0326854 A1* | 11/2014 | Delbruck | G01J 1/44 |
| | | | 250/204 |
| 2016/0093273 A1 | 3/2016 | Wang et al. | |
| 2016/0163752 A1 | 6/2016 | Sambongi et al. | |
| 2016/0187196 A1 | 6/2016 | Kim et al. | |
| 2017/0059399 A1* | 3/2017 | Suh | G06F 3/0304 |
| 2018/0167575 A1* | 6/2018 | Watanabe | H04N 5/378 |
| 2020/0092507 A1* | 3/2020 | Park | H04N 5/341 |

OTHER PUBLICATIONS

Sony Global—Sony Releases Stacked CMOS Image Sensor for Smartphones with Industry's Highest 48 Effective Megapixels.
Smart FPA'S: are they worth the effort?

* cited by examiner

SOLID-STATE IMAGE PICKUP DEVICE AND IMAGE PICKUP DEVICE

CROSS REFERENCE TO RELATED APPLICATIONS

This application is a national stage application under 35 U.S.C. 371 and claims the benefit of PCT Application No. PCT/JP2019/035649 having an international filing date of 11 Sep. 2019, which designated the United States, which PCT application claimed the benefit of Japanese Priority Patent Application JP 2018-187784 filed on 2 Oct. 2018, the entire disclosures of each of which are incorporated herein by reference.

TECHNICAL FIELD

The present disclosure relates to a solid-state image pickup device and an image pickup device.

BACKGROUND ART

In the past, a synchronous solid-state image pickup device that captures image data (frame) in synchronization with a synchronization signal such as a vertical synchronization signal has been used in an image pickup device, etc. In this general synchronous solid-state image pickup device, image data can be acquired only at every cycle of the synchronization signal (for example, 1/60 seconds). Thus, it is difficult to deal with a case requesting faster processing in a field related to traffic, a robot, etc. Therefore, an asynchronous solid-state image pickup device has been proposed in which a detection circuit for detecting in real time that an amount of the received light exceeds a threshold value as an address event is provided for each pixel. The asynchronous solid-state image pickup device that detects an address event for each pixel is also referred to as a dynamic vision sensor (DVS).

CITATION LIST

Patent Literature

PTL 1: JP 2016-533140A

SUMMARY

Technical Problem

However, in a DVS in the related art, a wavelength selection element such as a color filter has not been mounted due to a structural characteristic of asynchronously reading a pixel signal from each pixel. For this reason, there has been a problem that a color image may not be acquired by the DVS.

In this regard, the present disclosure proposes a solid-state image pickup device and an image pickup device capable of acquiring a color image.

Solution to Problem

According to an embodiment of the present disclosure, there is provided a solid-state image pickup device including a plurality of light receiving portions, each of which receives light of a specific wavelength to generate an electric charge corresponding to an amount of the received light, a detector that detects a photoelectric current based on an electric charge generated in at least one of the plurality of light receiving portions, a generator that generates a voltage signal based on the electric charge generated in each of the plurality of light receiving portions, and a driving circuit that causes the generator to generate voltage signals based on electric charges generated in at least two of the plurality of light receiving portions, respectively, on the basis of a detection result of the photoelectric current by the detector.

DESCRIPTION OF EMBODIMENTS

Figure 1:
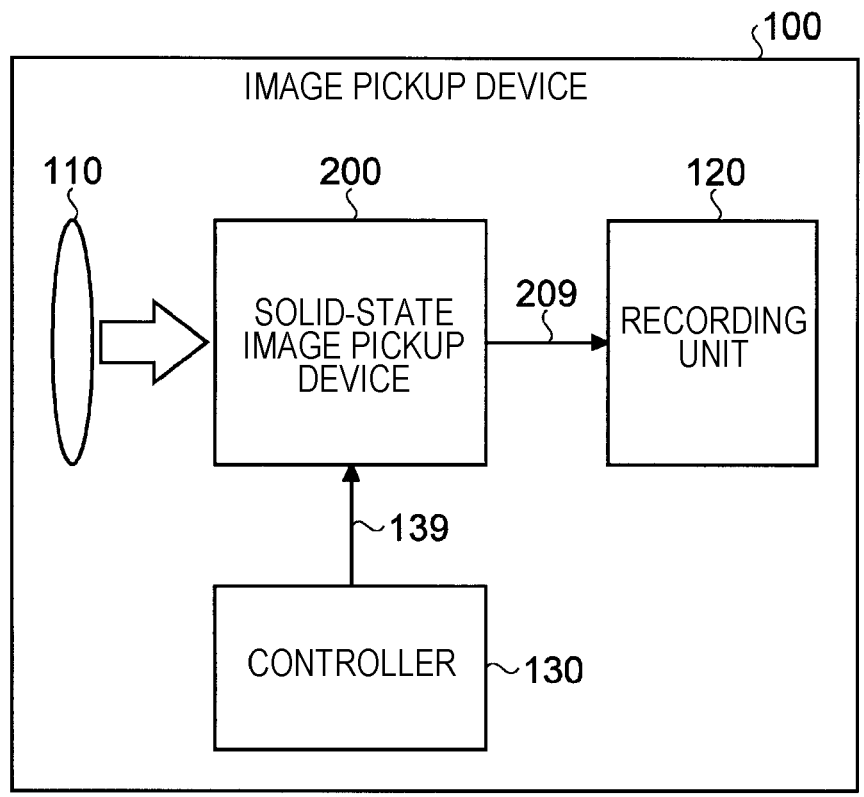
FIG. 1 is a block diagram illustrating a schematic configuration example of a solid-state image pickup device and an image pickup device according to a first embodiment.

Hereinafter, an embodiment of the present disclosure will be described in detail with reference to drawings. Note that in embodiments below, a repeated description will be omitted by assigning the same reference numeral to the same part.

In addition, the present disclosure will be described according to an item order shown below.

1. Introduction
2. First Embodiment
2.1 Configuration example of image pickup device
2.2 Configuration example of solid-state image pickup device
  2.2.1 Stacked configuration example of solid-state image pickup device
  2.2.2 Functional configuration example of solid-state image pickup device
2.3 Configuration example of pixel array portion
2.4 Example of pixel block
  2.4.1 Bayer array
  2.4.2 X-Trans (registered trademark) type array
  2.4.3 Quad Bayer array
  2.4.4 Other
2.5 Detection of firing of address event
2.6 Configuration example of pixel block
2.7 Configuration example of address event detector
2.8 Configuration example of current-voltage conversion unit
2.9 Configuration example of subtractor and quantizer
2.10 Configuration example of column ADC
2.11 Operation example of solid-state image pickup device
  2.11.1 Timing chart
  2.11.2 Flowchart
2.12 Effects
3. Second Embodiment
3.1 Detection of firing of address event
3.2 Configuration example of pixel block
3.3 Operation example of solid-state image pickup device
3.4 Effects
4. Third Embodiment
4.1 Example of pixel block
4.2 Effects
5. Fourth Embodiment
5.1 Example of pixel block
5.2 Effects
6. Fifth Embodiment
6.1 Example of pixel block
6.2 Modification 1
6.3 Modification 2
6.4 Effects
7. Sixth Embodiment
7.1 Example of pixel block
7.2 Modification 1
7.3 Modification 2
7.4 Effects
8. Seventh Embodiment
8.1 Effects 1. Introduction A general dynamic vision sensor (DVS) adopts a so-called event-driven type driving method of detecting presence or absence of firing of an address event for each unit pixel, and reading a pixel signal from a unit pixel where an address event fires in a case where firing of the address event is detected.

Note that the unit pixel in this description is a minimum unit of a pixel including one photoelectric conversion element (also referred to as a light receiving element), and corresponds to, for example, each dot in image data read from an image sensor. In addition, the address event is an event occurring for each address allocated to each of a plurality of unit pixels arrayed in a 2D lattice pattern, and corresponds to, for example, an event in which a current value of a photoelectric current based on an electric charge generated in the photoelectric conversion element or a change amount thereof exceeds a certain threshold value, etc.

In such an event-driven type DVS, reading for each unit pixel is asynchronously executed unlike a general image sensor such as a complementary metal-oxide semiconductor (CMOS) image sensor or a charge coupled device (CCD) image sensor. For this reason, for example, when a wavelength selection element such as a color filter is merely mounted on the DVS to acquire a color image, in a case where a color is reconstructed on the basis of wavelength components used for reconstruction of the color, for example, three primary colors of RGB, synchronous reading of pixel signals of a wavelength component of read (R), a wavelength component of green (G), and a wavelength component of blue (B) is not ensured, and each of the pixel signals is read at an irregular timing. As a result, a temporal shift or a spatial shift occurs in the wavelength components used for reconstruction of the color, making it difficult to reconstruct a correct color.

Note that for example, the temporal shift refers to a shift on a time axis due to a timing shift caused by asynchronous reading of pixel signals of all wavelength components used for reconstruction of the color. In addition, for example, the spatial shift refers to a shift in a color space resulting from difficulty in determining a white level for white balance adjustment on the basis of the pixel signals of all wavelength components used for reconstruction of the color.

Therefore, in embodiments below, a solid-state image pickup device and an image pickup device capable of acquiring a color image in which a color is correctly reconstructed will be described in detail with some examples.

In addition, in some of the embodiments below, a solid-state image pickup device and an image pickup device capable of reconstructing polarization information of incident light instead of reconstruction of a color or together with reconstruction of a color will be described in detail with some examples.

2. First Embodiment

First, a solid-state image pickup device and an image pickup device according to a first embodiment of the present disclosure will be described in detail with reference to drawings.

2.1 Configuration Example of Image Pickup Device

FIG. 1 is a block diagram illustrating a schematic configuration example of the solid-state image pickup device and the image pickup device according to the first embodiment. As illustrated in FIG. 1, for example, the image pickup device 100 includes an imaging lens 110, a solid-state image pickup device 200, a recording unit 120, and a controller 130. A camera mounted on an industrial robot, an in-vehicle camera, etc. is assumed as the image pickup device 100.

The imaging lens 110 concentrates incident light and forms an image on a light receiving surface of the solid-state image pickup device 200. The light receiving surface refers to a surface on which photoelectric conversion elements (also referred to as light receiving elements) in the solid-state image pickup device 200 are arrayed. The solid-state image pickup device 200 photo-electrically converts incident light to generate image data. In addition, the solid-state image pickup device 200 performs predetermined signal processing such as noise removal or white balance adjustment on the generated image data. A result obtained by this signal processing and a detection signal indicating presence or absence of firing of the address event are output to the recording unit 120 via a signal line 209. Note that a method of generating the detection signal indicating presence or absence of firing of the address event will be described later.

The recording unit 120 includes, for example, a flash memory, a dynamic random access memory (DRAM), a static random access memory (SRAM), etc., and records data input from the solid-state image pickup device 200.

The controller 130 includes, for example, a central processing unit (CPU), etc., and outputs various instructions via a signal line 139, thereby controlling each unit in the image pickup device 100 such as the solid-state image pickup device 200.

2.2 Configuration Example of Solid-State Image Pickup Device

Next, a configuration example of the solid-state image pickup device 200 will be described in detail with reference to drawings.

2.2.1 Stacked Configuration Example of Solid-State Image Pickup Device

Figure 2:
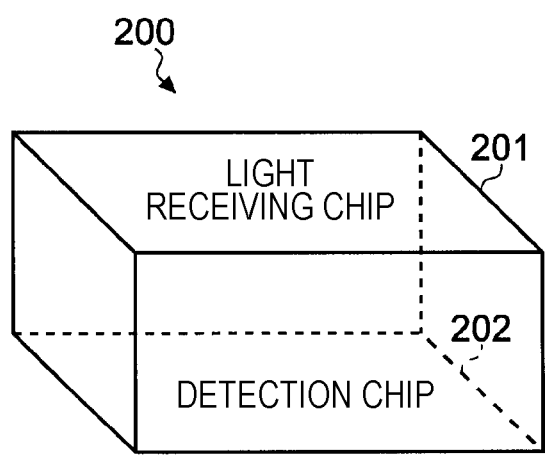
FIG. 2 is a diagram illustrating a stacked structure example of the solid-state image pickup device according to the first embodiment.

FIG. 2 is a diagram illustrating a stacked structure example of the solid-state image pickup device according to the first embodiment. As illustrated in FIG. 2, the solid-state image pickup device 200 has a structure in which a light receiving chip 201 and a detection chip 202 are vertically stacked. As bonding of the light receiving chip 201 and the detection chip 202, for example, it is possible to use so-called direct bonding in which respective bonding surfaces are planarized and pasted together by electron force. However, the present disclosure is not limited thereto. For example, it is possible to use so-called Cu—Cu bonding in which copper (Cu) electrode pads formed on bonding surfaces thereof are bonded to each other, bump bonding, etc.

In addition, the light receiving chip 201 and the detection chip 202 are electrically connected via, for example, a connecting portion such as a through-silicon via (TSV) penetrating a semiconductor substrate. For connection using the TSV, for example, it is possible to adopt a so-called twin TSV system in which two TSVs, that is, a TSV provided on the light receiving chip 201 and a TSV provided from the light receiving chip 201 to the detection chip 202 are connected on an external surface of the chip, a so-called shared TSV system in which the chips are connected by a TSV penetrating therethrough from the light receiving chip 201 to the detection chip 202, and the like.

However, in the case of using Cu—Cu bonding or bump bonding for bonding the light receiving chip 201 and the detection chip 202, the chips are electrically connected through a Cu—Cu bonding portion or a bump bonding portion.

2.2.2 Functional Configuration Example of Solid-State Image Pickup Device

Figure 3:
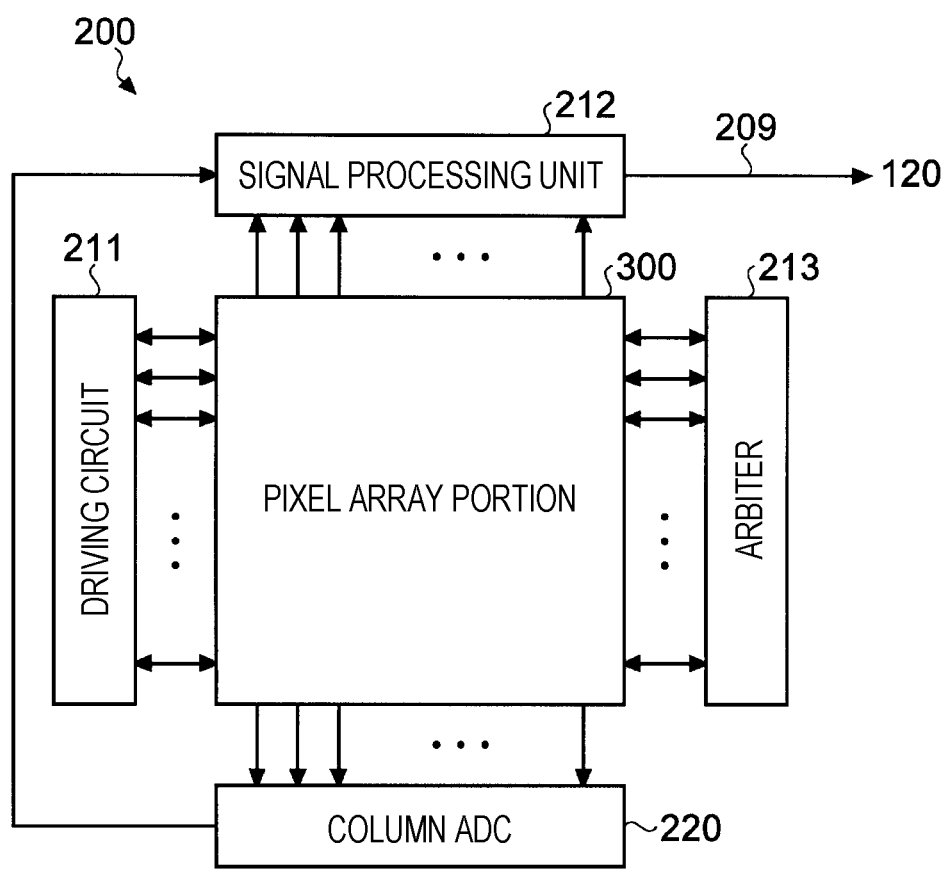
FIG. 3 is a block diagram illustrating a functional configuration example of the solid-state image pickup device according to the first embodiment.

FIG. 3 is a block diagram illustrating a functional configuration example of the solid-state image pickup device according to the first embodiment. As illustrated in FIG. 3, the solid-state image pickup device 200 includes a driving circuit 211, a signal processing unit 212, an arbiter 213, a column ADC 220, and a pixel array portion 300.

In the pixel array portion 300, a plurality of unit pixels is arrayed in a 2D lattice pattern. As will be described in detail later, for example, a unit pixel includes a photoelectric conversion element such as a photodiode and a circuit (hereinafter referred to as a pixel circuit or a pixel signal generator) for reading an electric charge generated by photoelectric conversion from the photoelectric conversion element. Here, the pixel circuit can be shared by a plurality of photoelectric conversion elements. In this case, each unit pixel includes one photoelectric conversion element and the shared pixel circuit.

A plurality of unit pixels arrayed in the 2D lattice pattern in the pixel array portion 300 is grouped into a plurality of pixel blocks, each of which includes a predetermined number of unit pixels. Hereinafter, a set of unit pixels or pixel blocks arrayed in a horizontal direction is referred to as "row", and a set of unit pixels or pixel blocks arrayed in a direction perpendicular to the row is referred to as "column".

Each unit pixel generates an electric charge corresponding to the amount of light received by the photoelectric conversion element. Each pixel block detects presence or absence of firing of an address event on the basis of whether or not a current value of a current resulting from an electric charge generated in any one of unit pixels belonging to the pixel block (hereinafter referred to as a photoelectric current) or a change amount thereof exceeds a predetermined threshold value. Then, when the address event fires, each pixel block outputs a request for reading a pixel signal having a voltage value corresponding to the amount of light received by the photoelectric conversion element from each unit pixel belonging to the pixel block to the arbiter 213.

The driving circuit 211 drives each of the unit pixels to output a pixel signal from each unit pixel to the column ADC 220.

The arbiter 213 arbitrates a request from each pixel block and transmits a predetermined response to a pixel block issuing the request on the basis of an arbitration result. Upon receiving this response, the pixel block supplies a detection signal indicating presence or absence of firing of the address event (hereinafter, simply referred to as an address event detection signal) to the driving circuit 211 and the signal processing unit 212.

For each column of a pixel block, the column ADC 220 converts an analog pixel signal from the column into a digital signal. Then, the column ADC 220 supplies the digital signal generated by conversion to the signal processing unit 212.

The signal processing unit 212 performs predetermined signal processing such as correlated double sampling (CDS) processing (noise removal) or white balance adjustment on the digital signal from the column ADC 220. Then, the signal processing unit 212 supplies a result of the signal processing and the address event detection signal to the recording unit 120 via the signal line 209.

2.3 Configuration Example of Pixel Array Portion

Figure 4:
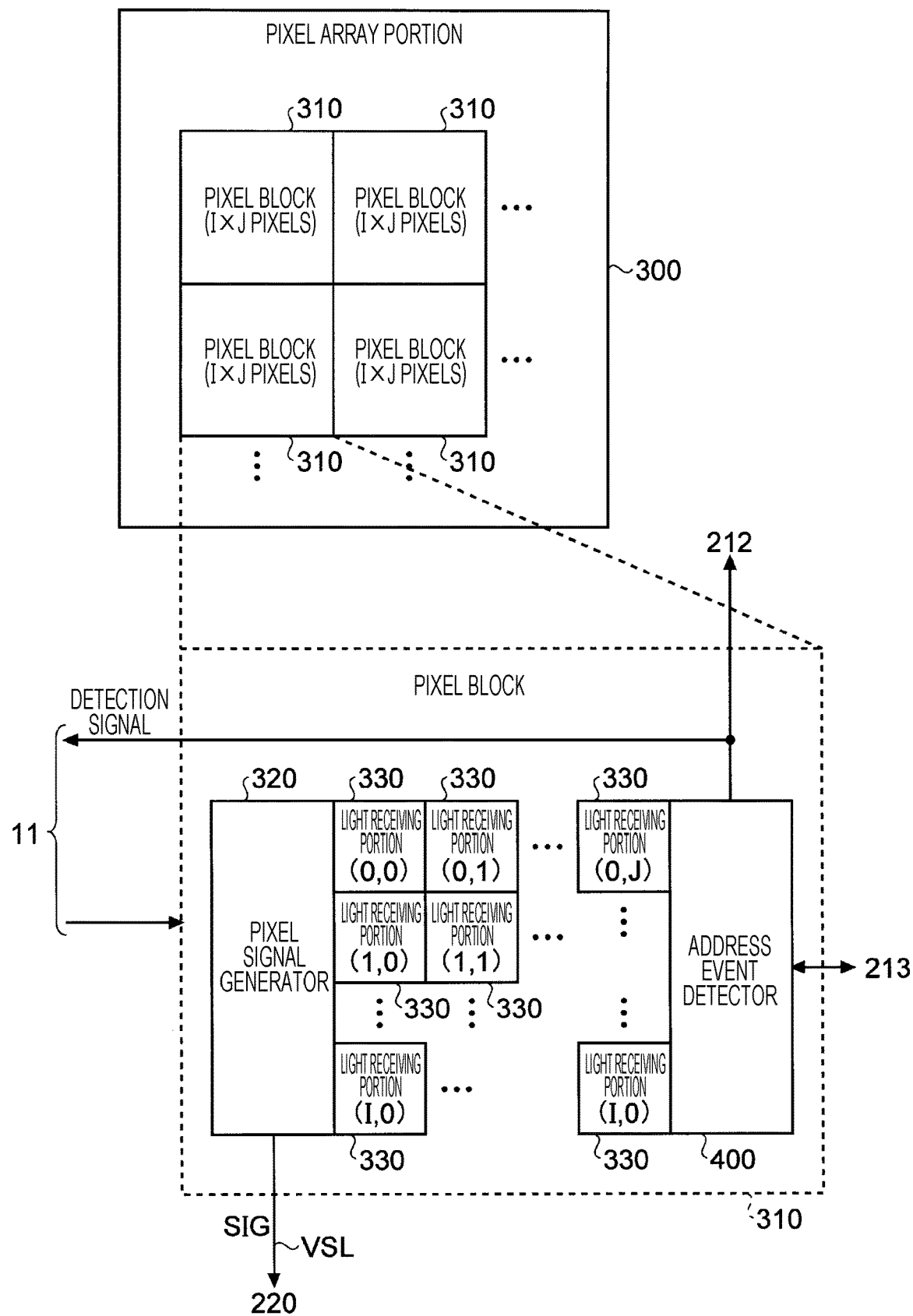
FIG. 4 is a block diagram illustrating a schematic configuration example of a pixel array portion according to the first embodiment.

Next, a configuration example of the pixel array portion 300 will be described. FIG. 4 is a block diagram illustrating a schematic configuration example of the pixel array portion according to the first embodiment. As illustrated in FIG. 4, a plurality of unit pixels in the pixel array portion 300 is grouped into a plurality of pixel blocks 310. Each of the pixel blocks 310 includes a plurality of unit pixels arrayed in I rows×J columns (I and J are positive integers).

Each pixel block 310 includes a pixel signal generator 320, a plurality of light receiving portions 330 of I rows×J columns, and an address event detector 400. The pixel signal generator 320 and the address event detector 400 are shared by the plurality of light receiving portions 330 in the pixel block 310. Therefore, each unit pixel includes one light receiving unit 330 and the shared pixel signal generator 320. Coordinates of the respective unit pixels conform to coordinates of the light receiving portions 330 arrayed in the 2D lattice pattern on the light receiving surface of the solid-state image pickup device 200.

One vertical signal line VSL is wired in a column of one pixel block 310. Therefore, when the number of columns of the pixel blocks 310 is set to m (m is a positive integer), m vertical signal lines VSL are arrayed in the pixel array portion 300.

The light receiving portion 330 is a photoelectric conversion element that generates a photoelectric current by photoelectric conversion of incident light. According to the control of the driving circuit 211, the light receiving portion 330 supplies the photoelectric current generated by photoelectric conversion to either the pixel signal generator 320 or the address event detector 400.

The pixel signal generator 320 generates a signal having a voltage value corresponding to an electric charge amount of the photoelectric current supplied from the light receiving portion 330 as a pixel signal SIG. The pixel signal generator 320 supplies the generated pixel signal SIG to the column ADC 220 via the vertical signal line VSL.

The address event detector 400 detects presence or absence of firing of the address event on the basis of whether or not a current value of the photoelectric current supplied from the light receiving portion 330 in the same pixel block 310 or a change amount thereof exceeds a predetermined threshold value. For example, this address event includes an ON event indicating that the change amount exceeds an upper limit threshold and an OFF event indicating that the change amount falls below a lower limit threshold. In addition, for example, the address event detection signal includes one bit indicating a detection result of the ON event and one bit indicating a detection result of the OFF event.

Note that the address event detector 400 may be configured to detect either the ON event or the OFF event.

When the address event fires, the address event detector 400 supplies a request to the arbiter 213 to request transmission of the detection signal. Further, upon receiving a response to the request from the arbiter 213, the address event detector 400 supplies the detection signal to the driving circuit 211 and the signal processing unit 212.

The driving circuit 211 to which the detection signal is supplied executes reading for each unit pixel belonging to the pixel block 310 that includes the address event detector 400 supplying the detection signal. By this reading, a pixel signal SIG having an analog value is input to the column ADC 220 in order from each unit pixel in the pixel block 310 to be read.

2.4 Example of Pixel Block

In the configuration illustrated in FIG. 4, for example, the pixel block 310 is configured by a combination of unit pixels that receive wavelength components used to reconstruct a color. For example, in the case of reconstructing a color on the basis of the three primary colors of RGB, the pixel block 310 is configured by a combination of a unit pixel receiving red (R) light, a unit pixel receiving green (G) light, and a unit pixel receiving blue (B) light.

Therefore, in the present embodiment, for example, the plurality of unit pixels arrayed in the 2D lattice pattern in the pixel array portion 300 is grouped into a plurality of pixel blocks 310 on the basis of array of wavelength selection elements (for example, color filters) provided for the light receiving portion 330 of each unit pixel (hereinafter referred to as a color filter array).

Various arrays, for example, a Bayer array of 2×2 pixels, a color filter array of 3×3 pixels adopted for X-Trans (registered trademark) CMOS sensor (hereinafter referred to as an X-Trans (registered trademark) type array), a Quad Bayer array of 4×4 pixels (also referred to as a quadratic array), etc. are present as the color filter array.

Therefore, hereinafter, the pixel block 310 corresponding to the case of adopting a representative color filter array will be described with some examples.

2.4.1 Bayer Array

Figure 5:
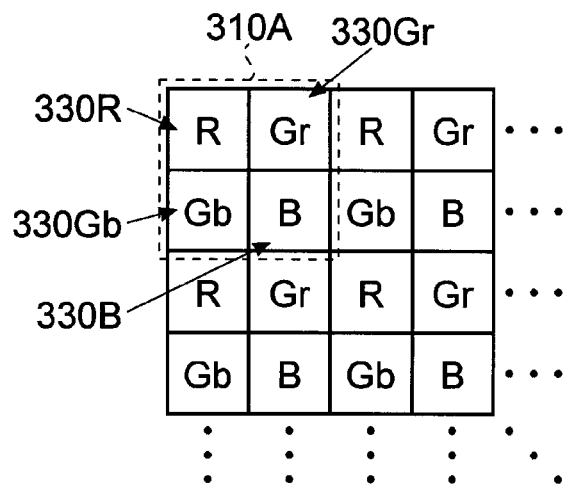
FIG. 5 is a schematic diagram illustrating a configuration example in a case where a Bayer array of a pixel block according to the first embodiment is adopted.

FIG. 5 is a schematic diagram illustrating a configuration example of the pixel block corresponding to the case of adopting the Bayer array for the color filter array. As illustrated in FIG. 5, in the case of adopting the Bayer array for the color filter array, one pixel block 310A includes a basic pattern (hereinafter referred to as a unit pattern) having a total of four unit pixels of 2×2 pixels which is a unit of repetition in the Bayer array. Therefore, for example, each pixel block 310A according to this example includes a light receiving portion 330R having a color filter of red (R) color, a light receiving portion 330Gr having a color filter of green (Gr) color, a light receiving portion 330 Gb having a color filter of green (Gb) color, and a light receiving portion 330B having a color filter of blue (B) color.

2.4.2 X-Trans (Registered Trademark) Type Array

Figure 6:
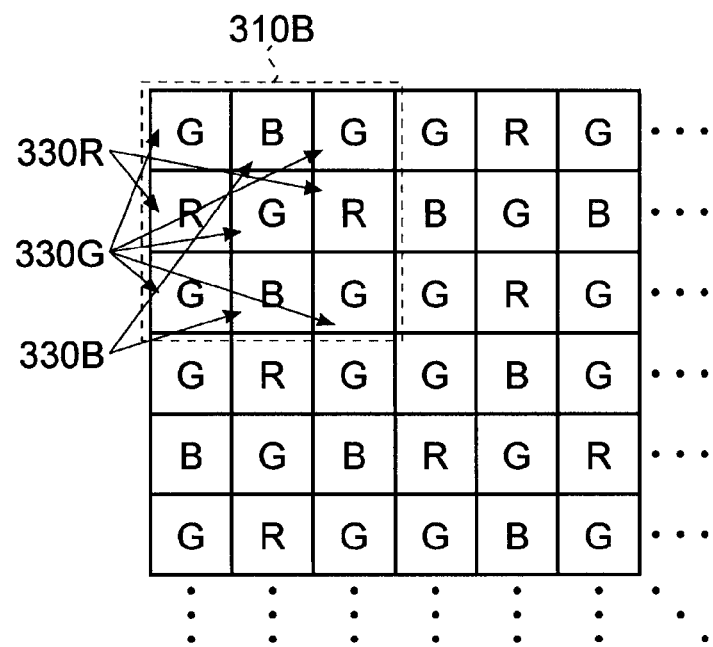
FIG. 6 is a schematic diagram illustrating a configuration example in a case where an X-Trans (registered trademark) type array of the pixel block according to the first embodiment is adopted.

FIG. 6 is a schematic diagram illustrating a configuration example of the pixel block corresponding to the case of adopting the X-Trans (registered trademark) type array for the color filter array. As illustrated in FIG. 6, in this example, one pixel block 310B includes a basic pattern (hereinafter referred to as a unit pattern) having a total of nine unit pixels of 3×3 pixels which is a unit of repetition in the X-Trans (registered trademark) type array. Therefore, for example, each pixel block 310B according to this example includes five light receiving portions 330G having color filters of green (G) color arrayed along two diagonal lines of a rectangular region forming the unit pattern, two light receiving portions 330R having color filters of red (R) color point-symmetrically arrayed with respect to the light receiving portion 330G located at a center of the rectangular region as a central axis, and two light receiving portions 330B having color filters of blue (B) color point-symmetrically arrayed with respect to the light receiving portion 330G located at the center of the rectangular region as a central axis in a same manner.

2.4.3 Quad Bayer Array

Figure 7:
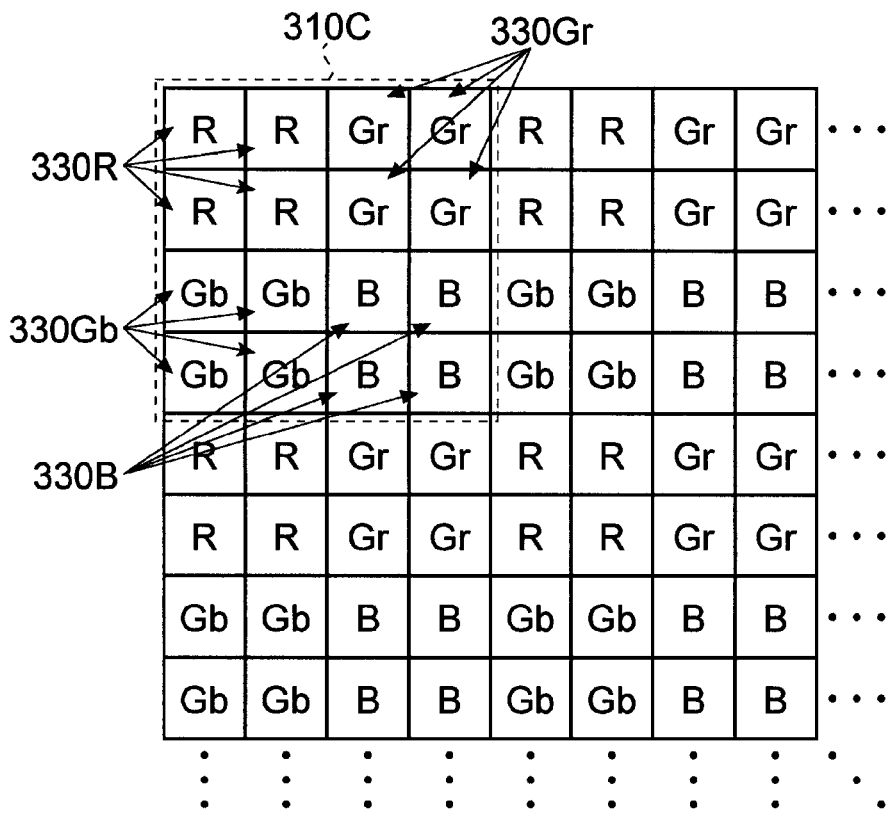
FIG. 7 is a schematic diagram illustrating a configuration example in a case where a Quad Bayer array of the pixel block according to the first embodiment is adopted.

FIG. 7 is a schematic diagram illustrating a configuration example of the pixel block corresponding to the case of adopting the Quad Bayer array for the color filter array. As illustrated in FIG. 7, in the case of adopting the Quad Bayer array for the color filter array, one pixel block 310C includes a basic pattern (hereinafter referred to as a unit pattern) having a total of sixteen unit pixels of 4×4 pixels which is a unit of repetition in the Quad Bayer array. Therefore, for example, each pixel block 310C according to this example includes a total of four light receiving portions 330R of 2×2 pixels having color filters of red (R) color, a total of four light receiving portions 330Gr of 2×2 pixels having color filters of green (Gr) color, a total of four light receiving portions 330Gb of 2×2 pixels having color filters of green (Gb) color, and a total of four light receiving portions 330B of 2×2 pixels having color filters of blue (B) color.

2.4.4 Other

Figure 8:
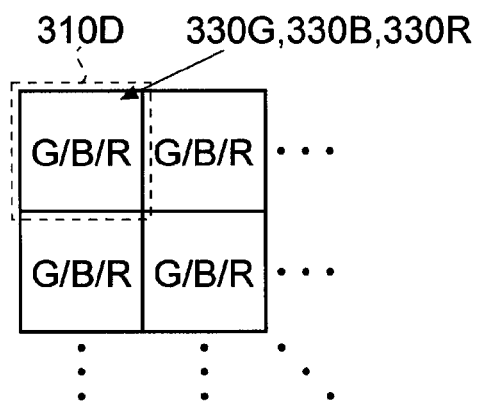
FIG. 8 is a schematic diagram illustrating a configuration example in a case where a unit pixel of the pixel block according to the first embodiment does not include a color filter.

FIG. 8 is a schematic diagram illustrating a configuration example of the pixel block in a case where the unit pixel does not include a color filter. For example, there are cases in which the solid-state image pickup device 200 does not include a color filter such as the case of having a structure in which the light receiving portions 330 for the three respective primary colors of RGB are arrayed along an incident direction of light (vertical product). As illustrated in FIG. 8, such as case has a structure in which a light receiving portion 330G for receiving light of green (G) color, a light receiving portion 330B for receiving light of blue (B) color, and a light receiving portion 330R for receiving light of red (R) color are provided in one pixel area 330G/B/R. Therefore, in such a case, in the present embodiment, a pixel block 310D includes three light receiving portion 330G, 330B, and 330R provided in one pixel area 330G/B/R.

As described above, in a case where the color filter is provided for the light receiving portion 330, a set of unit pixels included in a unit pattern of repetition in the color filter array can be used as a combination of unit pixels receiving wavelength components used to reconstruct a color. In addition, in a case where no color filter is provided, it is possible to use a set of unit pixels for each color component provided in one pixel area 330G/B/R.

However, the present disclosure is not limited thereto, and one pixel block 310 may include a set of unit pixels provided in a plurality of unit patterns or a plurality of pixel areas 330G/B/R. In addition, without being restricted by a unit pattern, it is possible to group a plurality of unit pixels in the pixel array portion 300 into a plurality of pixel blocks 310 so that each pixel block 310 includes a unit pixel used to reconstruct a color.

Note that in a structure in which the unit pixel includes no color filter, that is, in a structure in which the light receiving portions 330 are arrayed along an incident direction of light (vertical product), there is a case where a photoelectric conversion element 333 (see FIG. 11) in one or more of a plurality of light receiving portions 330 is formed using an organic material. However, in such a case, it is possible to have a structure in which a light receiving portion 330 having the photoelectric conversion element 333 formed using the organic material does not include a transfer transistor 331 (see FIG. 11) described later. Therefore, in such a case, the light receiving portion 330 having the photoelectric conversion element 333 formed using the organic material and a light receiving portion 330 having a photoelectric conversion element 333 formed in a semiconductor layer may be grouped into different pixel blocks 310.

2.5 Detection of Firing of Address Event

In the above configuration, in the present embodiment, firing of an address event is detected for each unit pixel, and a pixel signal SIG is read from all unit pixels belonging to a pixel block 310 that includes a unit pixel from which firing of the address event is detected. Note that in the following description, for the sake of simplicity, an example is given for a case where the Bayer array is adopted as the color filter array, and each pixel block 310 (corresponding to the pixel block 310A) includes a total of four light receiving portions 330R, 330Gr, 330Gb, and 330B of 2×2 pixels included in a unit pattern thereof.

Figure 9:
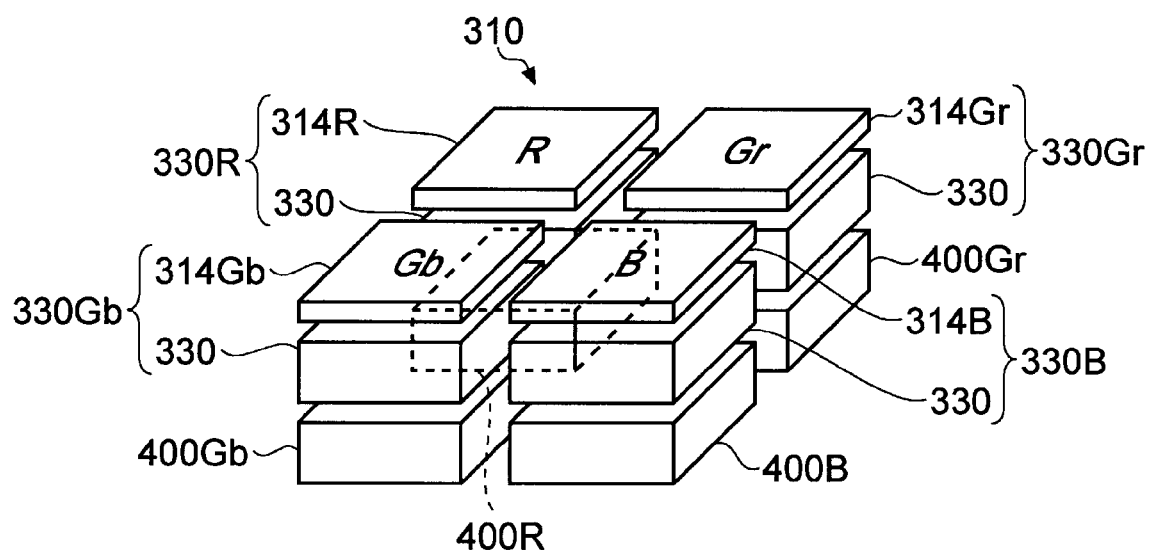
FIG. 9 is a schematic diagram illustrating an example of a configuration for detecting an address event according to the first embodiment.
Figure 10:
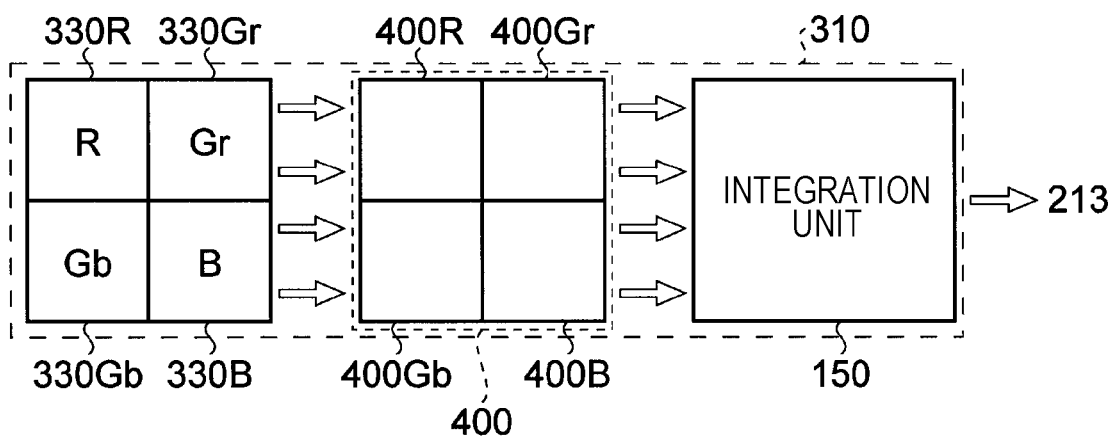
FIG. 10 is another schematic diagram illustrating an example of a configuration for detecting an address event according to the first embodiment.

FIG. 9 and FIG. 10 are schematic diagrams illustrating an example of a configuration of detecting an address event according to the present embodiment. As illustrated in FIG. 9, each of the plurality of light receiving portions 330R, 330Gr, 330Gb, and 330B included in the pixel block 310 has the light receiving portion 330 and a color filter 314R, 314Gr, 314Gb, or 314B. In addition, in the present embodiment, an individual address event detector 400R, 400Gr, 400Gb, or 400B is provided for each of the plurality of light receiving portions 330R, 330Gr, 330Gb, and 330B. That is, in the present embodiment, the address event detector 400 in FIG. 4 includes individual address event detectors 400R, 400Gr, 400Gb, and 400B provided for each of the light receiving portions 330R, 330Gr, 330Gb, and 330B.

As illustrated in FIG. 9 and FIG. 10, a photoelectric current output from each of the light receiving portions 330R, 330Gr, 330Gb, and 330B is input to the corresponding address event detector 400R, 400Gr, 400Gb, or 400B. In a case where a current value of the photoelectric current input from the corresponding light receiving portion 330R, 330Gr, 330Gb, or 330B or a change amount thereof exceeds a predetermined threshold value, each of the address event detectors 400R, 400Gr, 400Gb, and 400B outputs a request for requesting reading of the pixel signal SIG.

Outputs of the address event detectors 400R, 400Gr, 400Gb, and 400B are integrated by an integration unit 150. Therefore, a request output from at least one of the address event detectors 400R, 400Gr, 400Gb, and 400B is input to the arbiter 213 as a request common to the address event detectors 400R, 400Gr, 400Gb, and 400B, that is, a request in units of pixel blocks. As described above, in the present embodiment, in a case where a current value of a photoelectric current output by at least one of the light receiving portions 330R, 330Gr, 330Gb, and 330B included in the pixel block 310 or a change amount thereof exceeds a predetermined threshold value, a request for reading a pixel signal SIG from each of the four unit pixels belonging to the pixel block 310 is input to the arbiter 213.

2.6 Configuration Example of Pixel Block

Figure 11:
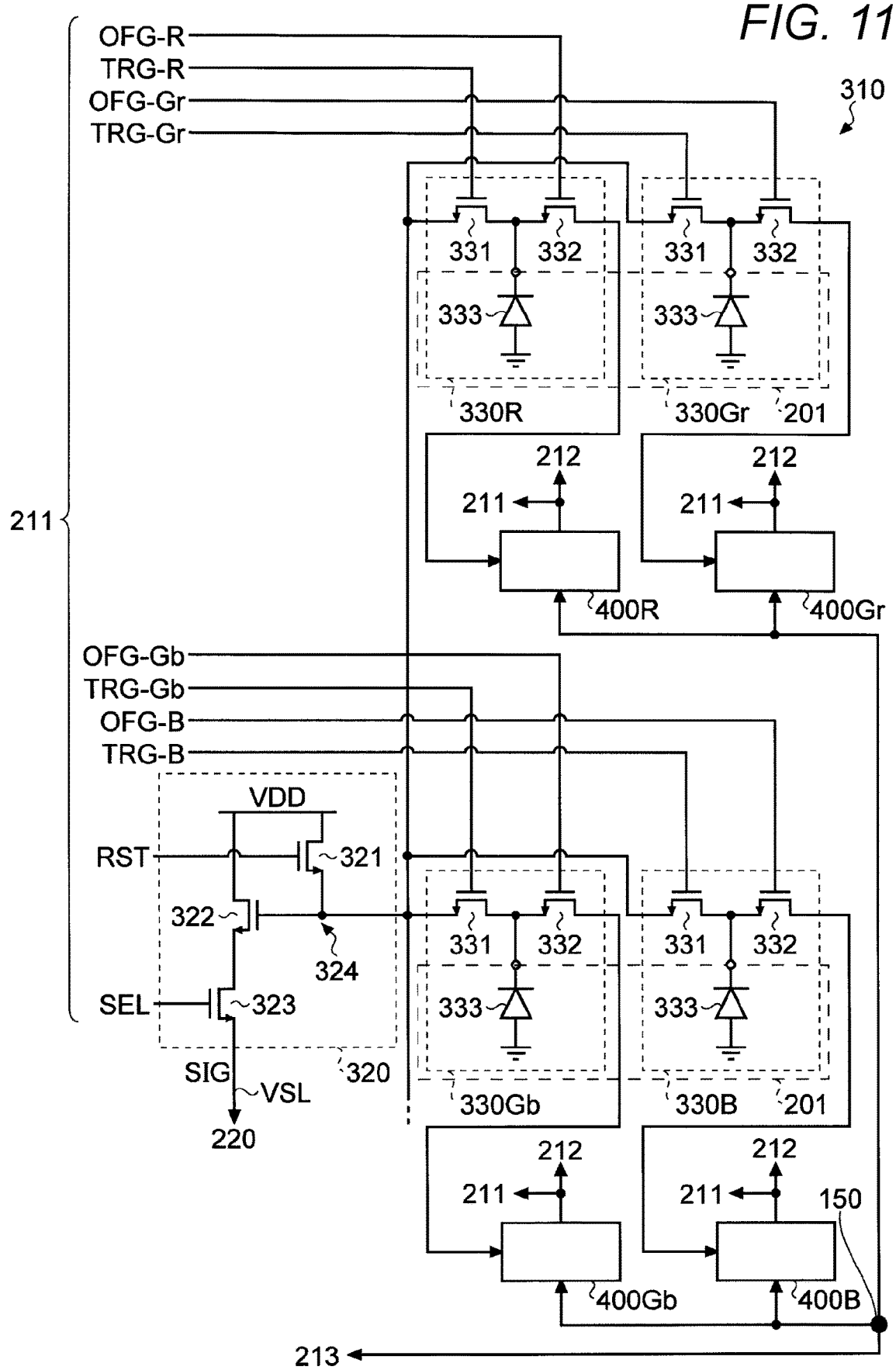
FIG. 11 is a circuit diagram illustrating a schematic configuration example of the pixel block according to the first embodiment.

Next, a configuration example of the pixel block will be described. FIG. 11 is a circuit diagram illustrating a schematic configuration example of the pixel block according to the first embodiment. As illustrated in FIG. 11, in the pixel block 310, the pixel signal generator 320 includes a reset transistor 321, an amplification transistor 322, a selection transistor 323, and a floating diffusion layer 324. Outputs of the plurality of light receiving portions 330R, 330Gr, 330Gb, and 330B included in the pixel block 310 are connected to the address event detectors 400R, 400Gr, 400Gb, and 400B individually provided for the respective light receiving portions.

Each of the light receiving portions 330R, 330Gr, 330Gb, and 330B includes the transfer transistor 331, an overflow gate (OFG) transistor 332, and the photoelectric conversion element 333. When the number of pixels in the pixel block 310 is set to N (N is a positive integer), N transfer transistors 331, N OFG transistors 332, and N photoelectric conversion elements 333 (in this example, N=4) are disposed in each pixel block 310.

In each pixel block 310, a transfer signal TRG-R is supplied from the driving circuit 211 to a gate of the transfer transistor 331 of the light receiving portion 330R, and a control signal OFG-R is supplied from the driving circuit 211 to a gate of the OFG transistor 332. In addition, a transfer signal TRG-Gr is supplied from the driving circuit 211 to a gate of a transfer transistor 331 of the light receiving portion 330Gr, and a control signal OFG-Gr is supplied from the driving circuit 211 to the gate of the OFG transistor 332. Further, a transfer signal TRG-Gb is supplied from the driving circuit 211 to a gate of a transfer transistor 331 of the light receiving portion 330Gb, and a control signal OFG-Gb is supplied from the driving circuit 211 to the gate of the OFG transistor 332. Furthermore, a transfer signal TRGB is supplied from the driving circuit 211 to a gate of a transfer transistor 331 of the light receiving portion 330B, and a control signal OFG-B is supplied from the driving circuit 211 to the gate of the OFG transistor 332. Hereinafter, in a case where the transfer signals TRG-R, TRG-Gr, TRG-Gb, and TRG-B are not distinguished, a sign thereof is set to TRG. In a similar manner, in a case where the control signals OFG-R, OFG-Gr, PFG-Gb, and OFG-B are not distinguished, a sign thereof is set to TRG.

Each of the reset transistor 321, the amplification transistor 322, and the selection transistor 323 is configured using, for example, an N-type metal-oxide-semiconductor (MOS) transistor. In a similar manner, the transfer transistor 331 and the OFG transistor 332 are formed using, for example, N-type MOS transistors.

The photoelectric conversion element 333 of each of the light receiving portions 330R, 330Gr, 330Gb, and 330B is disposed in the light receiving chip 201. In addition, for example, an element other than the photoelectric conversion element 333 in each of the light receiving portions 330R, 330Gr, 330Gb, and 330B is disposed in the detection chip 202.

In each of the light receiving portions 330R, 330Gr, 330Gb, and 330B, the photoelectric conversion element 333 photo-electrically converts incident light to generate an electric charge. The transfer transistor 331 transfers the electric charge from the corresponding photoelectric conversion element 333 to the floating diffusion layer 324 according to the transfer signal TRG. The OFG transistor 332 supplies the electric signal generated by the photoelectric conversion element 333 to the corresponding address event detector 400R, 400Gr, 400Gb, or 400B according to the control signal OFG. Here, the electric signal supplied to each of the address event detectors 400R, 400Gr, 400Gb, and 400B is a photoelectric current resulting from an electric charge generated in the photoelectric conversion element 333 of the corresponding light receiving portion 330R, 330Gr, 330Gb, or 330B.

The floating diffusion layer 324 accumulates an electric charge transferred as a photoelectric current from the photoelectric conversion element 333 via the transfer transistor 331, and generates a voltage corresponding to the accumulated electric charge amount. The reset transistor 321 discharges (initializes) the electric charge accumulated in the floating diffusion layer 324 according to a reset signal from the driving circuit 211. The amplification transistor 322 amplifies the voltage of the floating diffusion layer 324. The selection transistor 323 outputs a signal of the voltage amplified by the amplification transistor 322 as the pixel signal SIG to the column ADC 220 via the vertical signal line VSL according to a selection signal SEL from the driving circuit 211.

In response to instruction from the controller 130 to start detection of an address event, the driving circuit 211 drives the OFG transistors 332 of all the light receiving portions 330R, 330Gr, 330Gb, and 330B in the pixel array portion 300 by the control signal OFG to supply a photoelectric current. In this way, the photoelectric current is supplied to each of the address event detectors 400R, 400Gr, 400Gb, and 400B from the corresponding light receiving portion 330R, 330Gr, 330Gb, or 330B.

Outputs of a plurality of address event detectors 400R, 400Gr, 400Gb, and 400B associated with one pixel block 310 are integrated by the integration unit 150 which is a node that joins output lines of the respective address event detectors 400R, 400Gr, 400Gb, and 400B. Therefore, when any one of the address event detectors 400R, 400Gr, 400Gb, and 400B associated with a certain pixel block 310 detects firing of an address event, a request of the pixel block 310 is input to the arbiter 213.

As described above, when a request in units of pixel blocks is input, the arbiter 213 arbitrates a request from each pixel block 310, and transmits a predetermined response to a pixel block 310 issuing the request on the basis of an arbitration result. The pixel block 310 receiving this response supplies a detection signal (address event detection signal) indicating presence or absence of firing of an address event to the driving circuit 211 and the signal processing unit 212.

The driving circuit 211 turns OFF OFG transistors 332 in all light receiving portions 330R, 330Gr, 330Gb, and 330B belonging to the pixel block 310 which is a supply source of the address event detection signal. In this way, supply of the photoelectric current to the corresponding address event detector 400R, 400Gr, 400Gb, or 400B from each of the light receiving portions 330R, 330Gr, 330Gb, and 330B in the pixel block 310 is suspended.

Subsequently, the driving circuit 211 drives the transfer transistors 331 in all the light receiving portions 330R, 330Gr, 330Gb, and 330B belonging to the pixel block 310 in order by the transfer signal TRG. In this way, an electric charge accumulated in the photoelectric conversion element 333 are transferred in order from all the light receiving portions 330R, 330Gr, 330Gb, and 330B of the pixel block 310 to the floating diffusion layer 324 of the pixel signal generator 320. Then, pixel signals SIG of the plurality of respective unit pixels in the pixel block 310 are output in order from the pixel signal generator 320.

As described above, the solid-state image pickup device 200 outputs pixel signals SIG from the light receiving portions 330R, 330Gr, 330Gb, and 330B included in the pixel block 310 from which firing of the address event is detected to the column ADC 220. In this way, it is possible to reduce power consumption of the solid-state image pickup device 200 and the processing amount of image processing when compared to a case where pixel signals SIG are read from all unit pixels irrespective of presence or absence of firing of an address event.

2.7 Configuration Example of Address Event Detector

Figure 12:
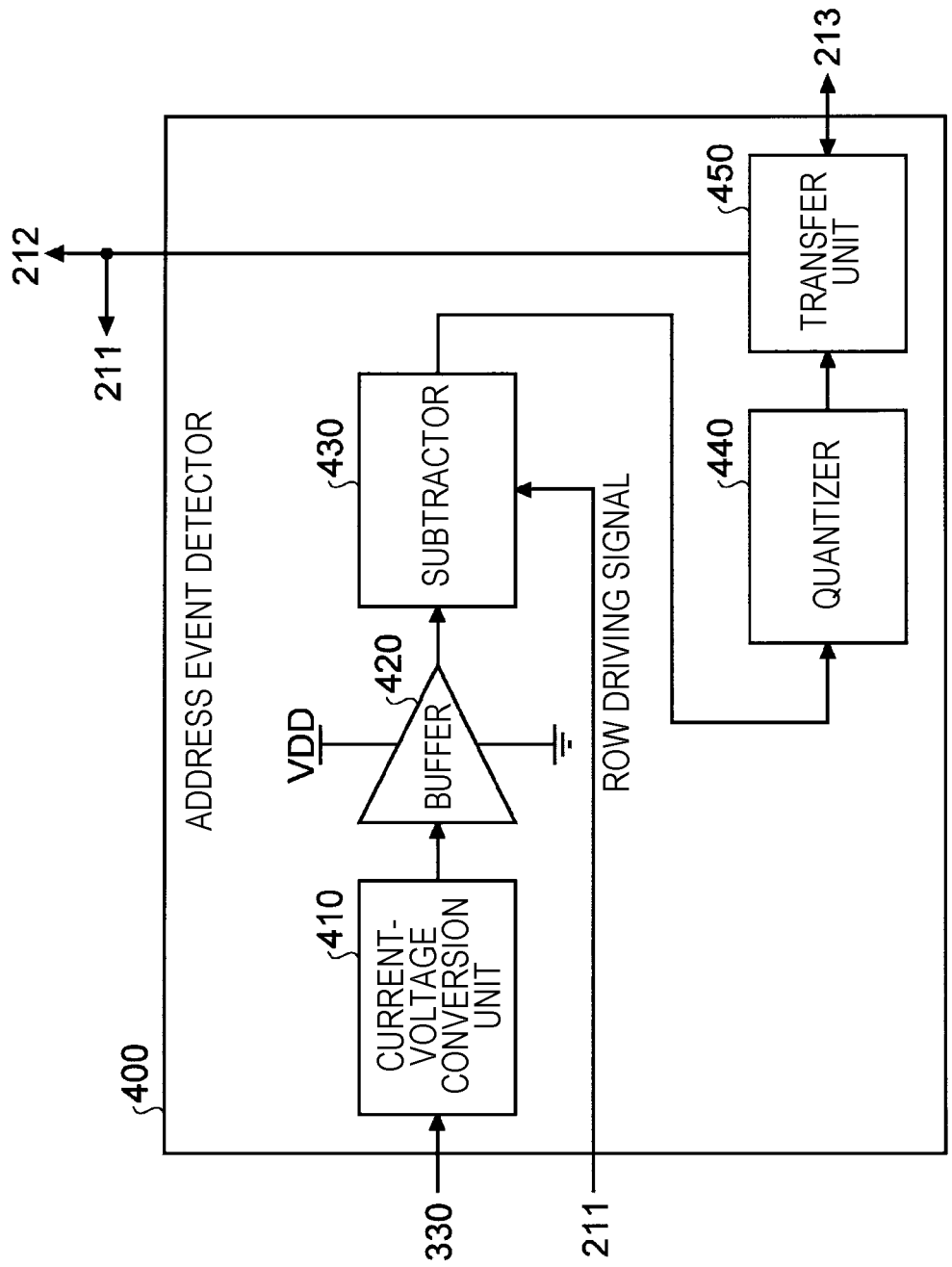
FIG. 12 is a block diagram illustrating a schematic configuration example of an address event detector according to the first embodiment.

FIG. 12 is a block diagram illustrating a schematic configuration example of the address event detector according to the first embodiment. As illustrated in FIG. 12, the address event detector 400 includes a current-voltage conversion unit 410, a buffer 420, a subtractor 430, a quantizer 440, and a transfer unit 450. Note that in description below, in a case where the light receiving portions 330R, 330Gr, 330Gb, and 330B are not distinguished, reference numerals thereof are set to 330. In a similar manner, in description below, in a case where the address event detectors 400R, 400Gr, 400Gb, and 400B are not distinguished, reference numerals thereof are set to 400.

The current-voltage conversion unit 410 converts the photoelectric current from the light receiving portion 330 into a logarithmic voltage signal, and supplies the voltage signal generated in this way to the buffer 420.

The buffer 420 corrects the voltage signal from the current-voltage conversion unit 410, and outputs the voltage signal after correction to the subtractor 430.

The subtractor 430 decreases a voltage level of the voltage signal from the buffer 420 according to the row driving signal from the driving circuit 211 and supplies the voltage signal after decrease to the quantizer 440.

The quantizer 440 quantizes the voltage signal from the subtractor 430 into a digital signal and outputs the digital signal generated in this way to the transfer unit 450 as a detection signal.

The transfer unit 450 transfers the detection signal from the quantizer 440 to the signal processing unit 212, etc. For example, when firing of the address event is detected, the transfer unit 450 supplies a request to the arbiter 213 for requesting transmission of an address event detection signal from the transfer unit 450 to the driving circuit 211 and the signal processing unit 212. Then, upon receiving a response to the request from the arbiter 213, the transfer unit 450 supplies the detection signal to the driving circuit 211 and the signal processing unit 212.

2.8 Configuration Example of Current-Voltage Conversion Unit

Figure 13:
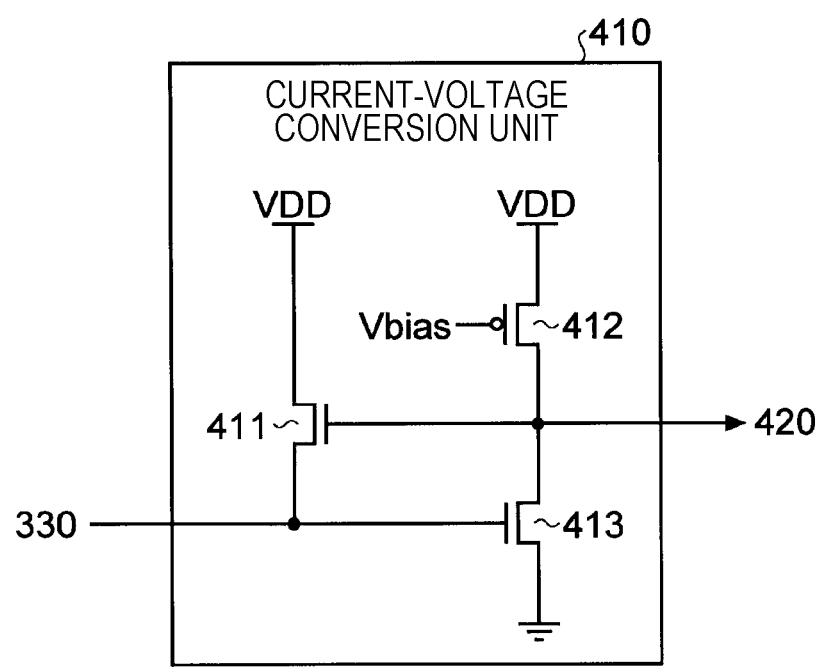
FIG. 13 is a circuit diagram illustrating a schematic configuration example of a current-voltage conversion unit according to the first embodiment.

FIG. 13 is a circuit diagram illustrating a schematic configuration example of the current-voltage conversion unit according to the first embodiment. As illustrated in FIG. 13, the current-voltage conversion unit 410 includes N-type transistors 411 and 413 and a P-type transistor 412. The N-type transistors 411 and 413 and the P-type transistor 412 may be, for example, MOS transistors.

A source of the N-type transistor 411 is connected to the light receiving portion 330, and a drain thereof is connected to a power supply terminal. The P-type transistor 412 and the N-type transistor 413 are connected in series between the power supply terminal and an earth terminal. In addition, a connection node between the P-type transistor 412 and the N-type transistor 413 is connected to a gate of the N-type transistor 411 and an input terminal of the buffer 420. In addition, a predetermined bias voltage Vbias is applied to a gate of the P-type transistor 412.

The drains of the N-type transistors 411 and 413 are connected to the power supply side, thereby forming a source follower circuit. By configuring such a loop-like source follower circuit, the photoelectric current from the light receiving portion 330 is converted into a voltage signal having a logarithmic value corresponding to an electric charge amount thereof. In addition, the P-type transistor 412 supplies a constant current to the N-type transistor 413.

2.9 Configuration Example of Subtractor and Quantizer

Figure 14:
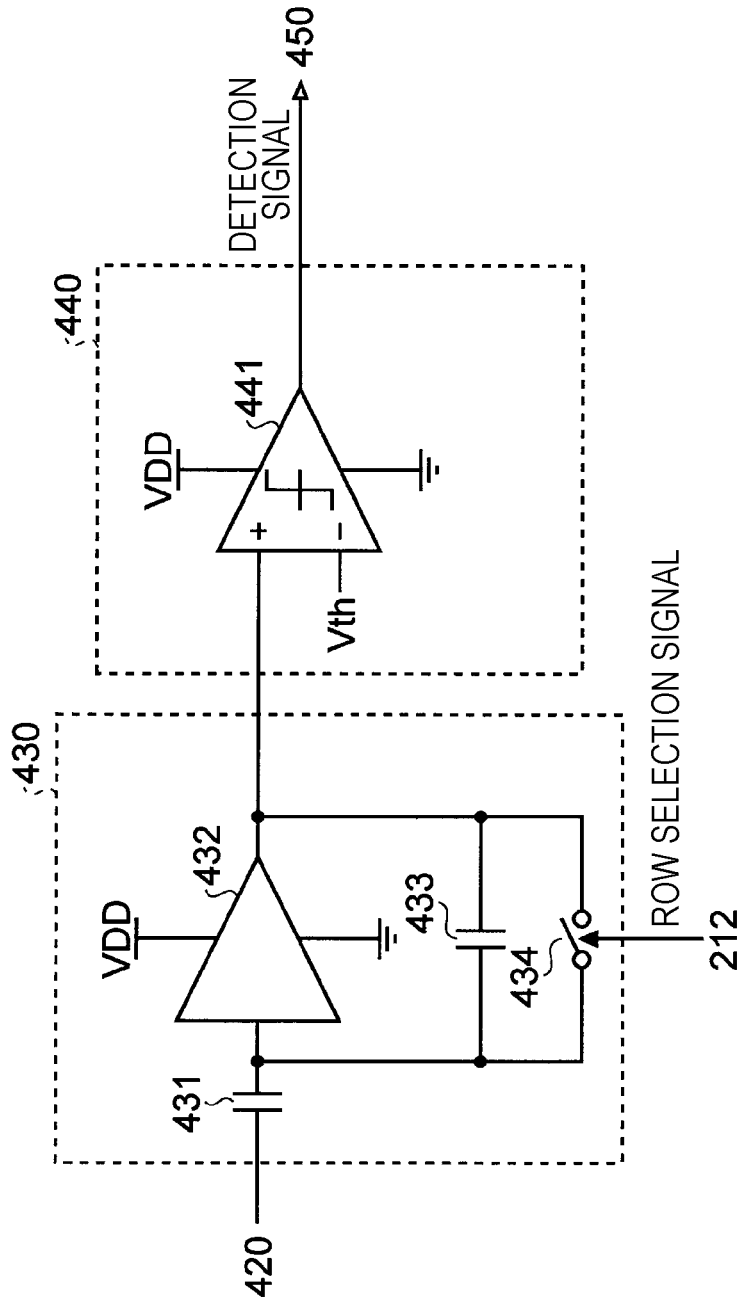
FIG. 14 is a circuit diagram illustrating a schematic configuration example of a subtractor and a quantizer according to the first embodiment.

FIG. 14 is a circuit diagram illustrating a schematic configuration example of the subtractor and the quantizer according to the first embodiment. The subtractor 430 includes capacitors 431 and 433, an inverter 432, and a switch 434. In addition, the quantizer 440 includes a comparator 441.

One end of the capacitor 431 is connected to an output terminal of the buffer 420, and the other end thereof is connected to an input terminal of the inverter 432. The capacitor 433 is connected in parallel with the inverter 432. The switch 434 opens and closes a path connecting both ends of the capacitor 433 according to the row driving signal.

The inverter 432 inverts a voltage signal input via the capacitor 431. The inverter 432 outputs the inverted signal to a non-inverting input terminal (+) of the comparator 441.

When the switch 434 is turned ON, a voltage signal Vinit is input to the buffer 420 side of the capacitor 431. In addition, the opposite side corresponds to a virtual earth terminal. For the sake of convenience, a potential of this virtual earth terminal is set to zero. In this instance, when the capacitance of the capacitor 431 is set to C1, the potential Qinit accumulated in the capacitor 431 is expressed by Equation (1) below. Meanwhile, since both ends of the capacitor 433 are short-circuited, an accumulated charge thereof becomes zero.

$$Qinit = C1 \times Vinit \quad (1)$$

Subsequently, considering a case where the switch 434 is turned OFF and the voltage on the buffer 420 side of the capacitor 431 is changed to Vafter, an electric charge Qafter accumulated in the capacitor 431 is expressed by the following Equation (2).

$$Qafter = C1 \times Vafter \quad (2)$$

Meanwhile, when an output voltage is set to Vout, an electric charge Q2 accumulated in the capacitor 433 is expressed by the following Equation (3).

$$Q2 = -C2 \times Vout \quad (3)$$

In this instance, since the total electric charge amount of the capacitors 431 and 433 does not change, the following Equation (4) is satisfied.

$$Qinit = Qafter + Q2 \quad (4)$$

When Equation (4) is transformed by substituting Equations (1) to (3) into Equation (4), the following Equation (5) is obtained.

$$Vout = -(C1/C2) \times (Vafter - Vinit) \quad (5)$$

Equation (5) represents a subtraction operation for voltage signals, and the gain of a subtraction result is C1/C2. Normally, since it is desirable to maximize the gain, it is preferable to design C1 large and C2 small. Meanwhile, when C2 is excessively small, kTC noise increases, and a noise characteristic may deteriorate. Therefore, a capacity reduction of C2 is limited to a range in which noise can be tolerated. In addition, since the address event detector 400 including the subtractor 430 is mounted for each pixel block, the capacitances C1 and C2 have restrictions on the area. Considering these facts, the values of the capacitances C1 and C2 are determined.

The comparator 441 compares the voltage signal from the subtractor 430 with a predetermined threshold voltage Vth applied to an inverting input terminal (−). The comparator 441 outputs a signal indicating a comparison result to the transfer unit 450 as a detection signal.

In addition, when the conversion gain of the current-voltage conversion unit 410 is set to $CG_{log}$ and the gain of the buffer 420 is set to "1", the gain A of the entire address event detector 400 is expressed by the following Expression (6).

[Math. 1]

$$A = \frac{CG_{log} \cdot C1}{C2} \sum_{n=1}^{N} i_{photo\_n} \quad (6)$$

In Equation (6), $i_{photo\_n}$ is a photoelectric current of an nth unit pixel. For example, a unit thereof is ampere (A). N is the number of unit pixels in the pixel block 310.

2.10 Configuration Example of Column ADC

Figure 15:
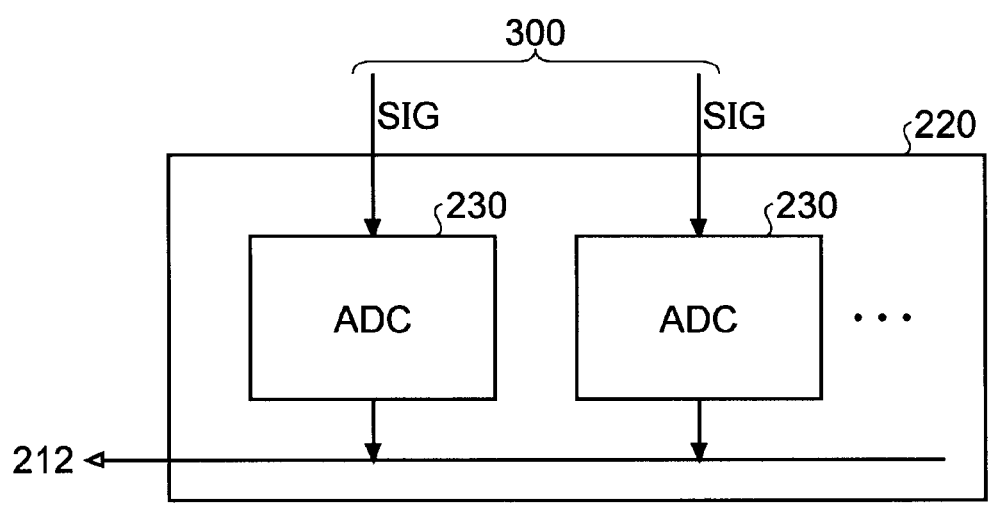
FIG. 15 is a block diagram illustrating a schematic configuration example of a column ADC according to the first embodiment.

FIG. 15 is a block diagram illustrating a schematic configuration example of the column ADC according to the first embodiment. The column ADC 220 includes a plurality of ADCs 230 provided for each column of the pixel block 310.

Each ADC 230 converts the analog pixel signal SIG supplied via the vertical signal line VSL into a digital signal. The pixel signal SIG is converted into a digital signal having a larger number of bits than that of the detection signal. For example, when the detection signal is set to 2 bits, the pixel signal SIG is converted into a digital signal of 3 bits or more (16 bits, etc.). The ADC 230 supplies the generated digital signal to the signal processing unit 212.

2.11 Operation Example of Solid-State Image Pickup Device

Next, an operation of the solid-state image pickup device 200 according to the present embodiment will be described in detail with reference to drawings.

2.11.1 Timing Chart

Figure 16:
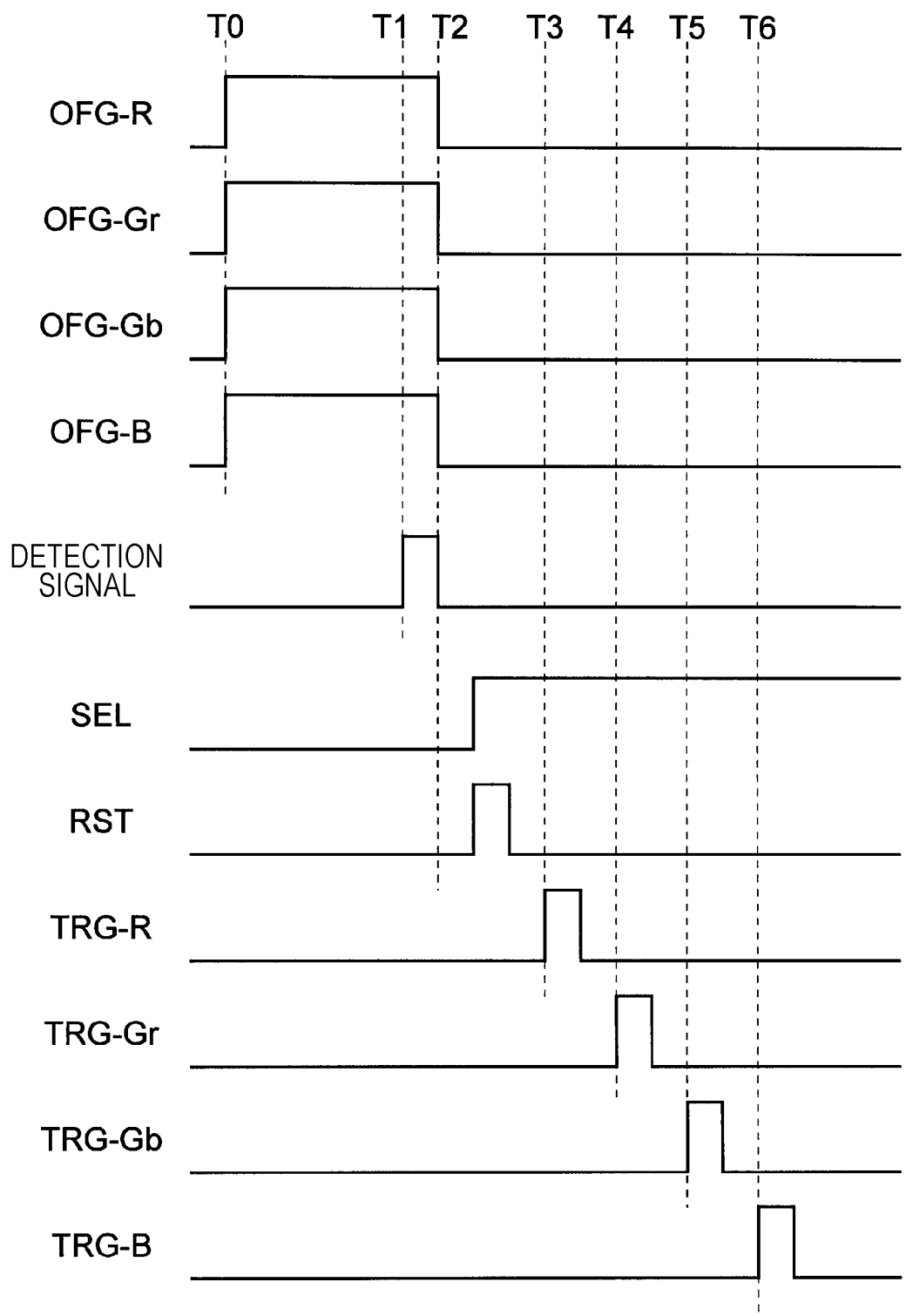
FIG. 16 is a timing chart illustrating an example of an operation of the solid-state image pickup device according to the first embodiment.

First, an example of an operation of the solid-state image pickup device 200 will be described with reference to a timing chart. FIG. 16 is a timing chart illustrating the example of the operation of the solid-state image pickup device according to the first embodiment.

As illustrated in FIG. 16, when the controller 130 instructs that detection of an address event be started at a timing T0, the driving circuit 211 raises control signals OFG-R, OFG-Gr, OFG-Gb, and OFG-B applied to gates of OFG transistors 332 of all the light receiving portions 330 in the pixel array portion 300 to high levels. In this way, the OFG transistors 332 of all the light receiving portions 330R, 330Gr, 330Gb, and 330B are turned ON, and a photoelectric current based on an electric charge generated in the photoelectric conversion element 333 of each of the light receiving portions 330R, 330Gr, 330Gb, and 330B is supplied from each of the light receiving portions 330R, 330Gr, 330Gb, and 330B to each of the address event detectors 400R, 400Gr, 400Gb, and 400B.

In addition, during a period in which the control signals OFG-R, OFG-Gr, OFG-Gb, and OFG-B are at high levels, the transfer signals TRG-R, TRG-Gr, TRG-Gb, and TRG-B applied to the gates of the transfer transistors 331 in the respective light receiving portions 330R, 330Gr, 330Gb, and 330B are maintained at low level. For this reason, during this period, the transfer transistors 331 of all the light receiving portions 330 are in the OFF state.

Subsequently, it is presumed that one or more address event detectors 400 in each pixel block 310 detect firing of an address event during the period in which the control signals OFG-R, OFG-Gr, OFG-Gb, and OFG-B are at high levels. In this case, the address event detector 400 detecting firing of the address event transmits a request to the arbiter 213. However, as described above, outputs of all the address event detectors 400 belonging to each pixel block 310 are integrated by the integration unit 150 and input to the arbiter 213 as a request in units of pixel blocks. For this reason, a response to the request is returned from the arbiter 213 to all the address event detectors 400R, 400Gr, 400Gb, and 400B belonging to the pixel block 310 including the address event detector 400 issuing the request (hereinafter referred to as a pixel block 310 to be read).

For example, the address event detectors 400R, 400Gr, 400Gb, and 400B receiving the response raise the detection signal input to the driving circuit 211 and the signal processing unit 212 to a high level during a period from a timing T1 to a timing T2. Note that in this description, it is presumed that the detection signal is a 1-bit signal indicating a detection result of an ON event.

The driving circuit 211 to which the detection signal at the high level is input from the address event detectors 400R, 400Gr, 400Gb, and 400B at the timing T1 lowers all the control signals OFG-R, OFG-Gr, OFG-Gb, and OFG-B to low levels at the subsequent timing T2. In this way, supply of the photoelectric currents from all the light receiving portions 330 of the pixel array portion 300 to the address event detector 400 is suspended.

In addition, the driving circuit 211 raises the selection signal SEL applied to the gate of the selection transistor 323 in the pixel signal generator 320 of the pixel block 310 to be read to a high level at the timing T2, and raises the reset signal RST applied to the gate of the reset transistor 321 of the same pixel signal generator 320 to a high level for a certain pulse period, thereby discharging (initializing) the electric charge accumulated in the floating diffusion layer 324 of the pixel signal generator 320. In this way, a voltage appearing on the vertical signal line VSL in a state in which the floating diffusion layer 324 is initialized is read by the ADC 230 connected to the vertical signal line VSL in the column ADC 220 as a pixel signal at a reset level (hereinafter simply referred to as a reset level) and converted into a digital value.

Subsequently, at the timing T3 after reading the reset level, for example, the driving circuit 211 applies a transfer signal TRG-R of a certain pulse period to the gate of the transfer transistor 331 of the light receiving portion 330R in the pixel block 310 to be read. In this way, an electric charge generated in the photoelectric conversion element 333 of the light receiving portion 330R is transferred to the floating diffusion layer 324 in the pixel signal generator 320, and a voltage corresponding to the electric charge accumulated in the floating diffusion layer 324 appears on the vertical signal line VSL. In this way, the voltage appearing on the vertical signal line VSL is read by the ADC 230 connected to the vertical signal line VSL in the column ADC 220 as a pixel signal at a signal level of the light receiving portion 330R (hereinafter simply referred to as a signal level) and converted into a digital value.

The signal processing unit 212 executes a CDS process of obtaining a difference between the reset level and the signal level read in this manner as a net pixel signal corresponding to the amount of light received by the photoelectric conversion element 333.

Subsequently, at a timing T4 after reading the signal level of the light receiving portion 330R, for example, the driving circuit 211 applies a transfer signal TRG-Gr of a certain pulse period to the gate of the transfer transistor 331 of the light receiving portion 330Gr in the pixel block 310 to be read in a same manner. In this way, an electric charge generated in the photoelectric conversion element 333 of the light receiving portion 330Gr is transferred to the floating diffusion layer 324 in the pixel signal generator 320, and a voltage corresponding to the electric charge accumulated in the floating diffusion layer 324 appears on the vertical signal line VSL. Then, the voltage appearing on the vertical signal line VSL is read by the ADC 230 of the column ADC 220 as a signal level of the light receiving portion 330Gr and converted into a digital value.

Thereafter, similarly, signal levels of the light receiving portions 330Gb and 330B in the pixel block 310 to be read are read by the ADC 230 of the column ADC 220 and converted into digital values (timings T5 and T6).

Thereafter, when reading of the signal levels from all the light receiving portions 330 in the pixel block 310 to be read is completed, the driving circuit 211 raises the control signals OFG-R, OFG-Gr, OFG-Gb, and OFG-B applied to gates of the OFG transistors 332 of all the light receiving portions 330 in the pixel array portion 300 to high levels, thereby supplying a photoelectric current based on the electric charge generated in the photoelectric conversion element 333 of each of the light receiving portions 330R, 330Gr, 330Gb, and 330B from each of the light receiving portions 330R, 330Gr, 330Gb, and 330B to each of the address event detectors 400R, 400Gr, 400Gb, and 400B.

2.11.2 Flowchart

Figure 17:
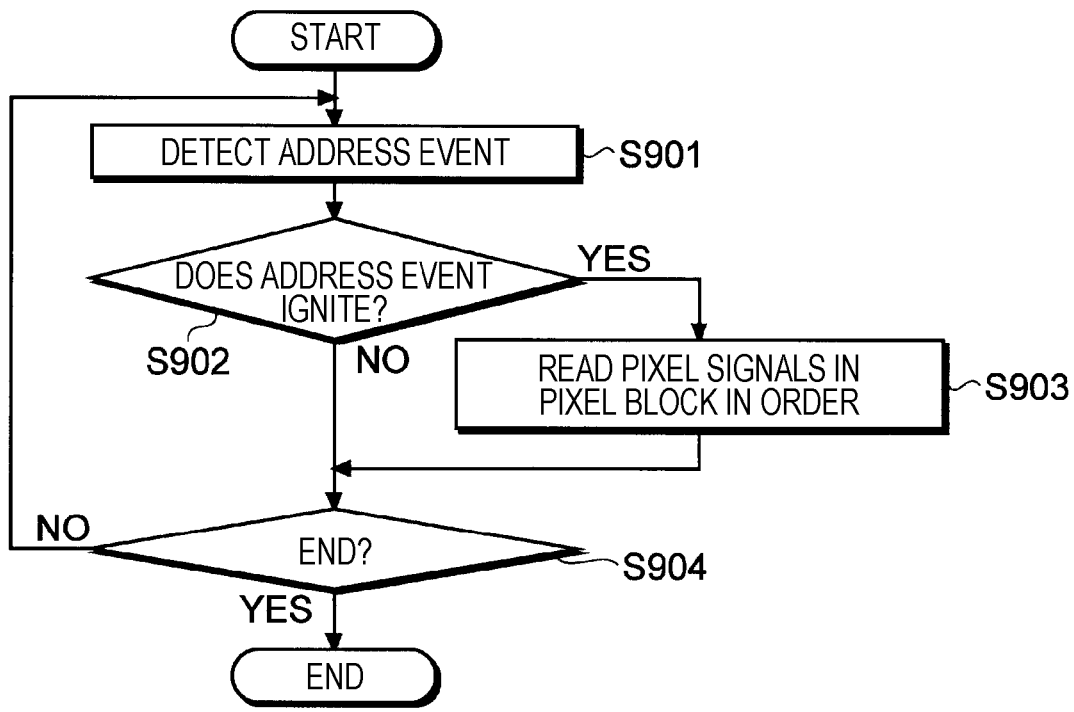
FIG. 17 is a flowchart illustrating an example of an operation of the solid-state image pickup device according to the first embodiment.

Next, an example of an operation of the solid-state image pickup device 200 will be described with reference to a flowchart. FIG. 17 is the flowchart illustrating the example of the operation of the solid-state image pickup device according to the first embodiment. For example, this operation is started when a predetermined application for detecting an address event is executed.

As illustrated in FIG. 17, in this operation, first, each of the pixel blocks 310 in the pixel array portion 300 detects presence or absence of firing of the address event (step S901). Then, the driving circuit 211 determines whether or not firing of the address event has been detected in any one of the pixel blocks 310 (step S902).

In a case where firing of the address event has not been detected (NO of step S902), this operation proceeds to step S904. On the other hand, in a case where firing of the address event has been detected (YES of step S902), the driving circuit 211 successively executes reading of pixel signals SIG on unit pixels belonging to a pixel block 310 from which firing of the address event has been detected, thereby successively reading the pixel signals SIG from the respective unit pixels belonging to the pixel block 310 to be read (step S903), and the operation proceeds to step S904.

In step S904, it is determined whether or not to end this operation. In the case of not ending this operation (NO of step S904), this operation returns to step S901, and subsequent operations are repeated. On the other hand, in the case of ending this operation (YES of step S904), this operation is ended.

2.12 Effects

As described above, in the first embodiment, a set (pixel block 310) of a plurality of (N) unit pixels receiving a wavelength component used to reconstruct a color is set to a unit (pixel block unit) for detecting presence or absence of firing of an address event. Further, in a case where firing of the address event is detected in units of pixel blocks, pixel signals SIG are read in units of pixel blocks. In this way, when the address events fires in a unit pixel of a certain wavelength component, pixel signals SIG of all wavelength components used to reconstruct a color are synchronously read, and thus it is possible to reconstruct a correct color. As a result, it is possible to realize an event-driven type solid-state image pickup device and image pickup device capable of acquiring a color image in which a color is correctly reconstructed.

3. Second Embodiment

Next, a solid-state image pickup device and an image pickup device according to a second embodiment of the present disclosure will be described in detail with reference to drawings. Note that in description below, a similar configuration, operation, and effect to those of the above-described embodiment will be cited, thereby omitting a repeated description thereof.

In the first embodiment described above, individual address event detectors 400 are provided for individual light receiving portions 330, and outputs of address event detectors 400 belonging to the same pixel block 310 are integrated by the integration unit 150, so that a request in units of pixel blocks is input to the arbiter 213. On the other hand, in the second embodiment, a case where a common address event detector 400 is provided for all light receiving portions 330 belonging to the same pixel block will be described by giving an example.

In the second embodiment, for example, a configuration example of the image pickup device, a configuration example of the solid-state image pickup device, a stacked configuration example of the solid-state image pickup device, a functional configuration example of the solid-state image pickup device, a configuration example of a pixel array portion, and an example of a pixel block may be similar to those described in the first embodiment with reference to FIG. 1 to FIG. 8, and thus a detailed description is omitted here. However, in the present embodiment, for convenience of description, a reference numeral of the pixel block is set to 510.

3.1 Detection of Firing of Address Event

In the present embodiment, as described above, a common address event detector 400 is provided for all light receiving portions 330 belonging to the same pixel block 510. Therefore, in the present embodiment, firing of an address event is detected for each pixel block 510, and pixel signals SIG are read from all unit pixels belonging to a pixel block 510 from which firing of the address event is detected. Note that in description below, for the sake of simplicity, an example is given for a case where the Bayer array is adopted as a color filter array and each pixel block 510 (corresponding to the pixel block 310A) includes a total of four light receiving portions 330R, 330Gr, 330Gb, and 330B of 2×2 pixels included in a unit pattern thereof.

Figure 18:
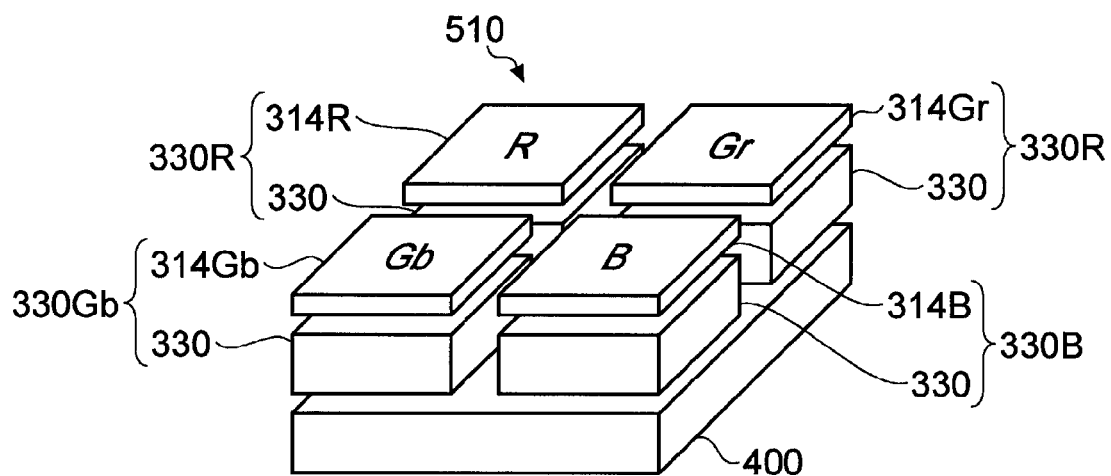
FIG. 18 is a schematic diagram illustrating an example of a configuration for detecting an address event according to a second embodiment.
Figure 19:
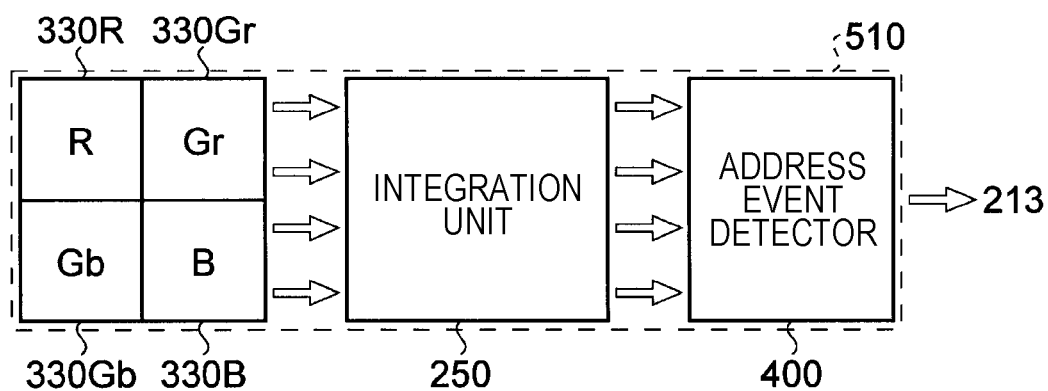
FIG. 19 is another schematic diagram illustrating an example of a configuration for detecting an address event according to the second embodiment.

FIG. 18 and FIG. 19 are schematic diagrams illustrating an example of a configuration for detecting an address event according to the present embodiment. As illustrated in FIG. 18, for example, each of a plurality of light receiving portions 330R, 330Gr, 330Gb, and 330B included in the pixel block 510 has a similar configuration to a configuration described with reference to FIG. 9 in the first embodiment. Meanwhile, in the present embodiment, a common address event detector 400 is provided for the plurality of light receiving portions 330R, 330Gr, 330Gb, and 330B.

As illustrated in FIG. 18 and FIG. 19, photoelectric currents output from the respective light receiving portions 330R, 330Gr, 330Gb, and 330B are integrated by an integration unit 250 and input to the common address event detector 400. In a case where a sum of photoelectric currents input from light receiving portions 330R, 330Gr, 330Gb, and 330B belonging to the same pixel block 510 or a change amount of the sum exceeds a predetermined threshold value, the address event detector 400 outputs a request for requesting reading of a pixel signal SIG to an arbiter 213. In this way, in the present embodiment, in a case where a sum of photoelectric currents input from the light receiving portions 330R, 330Gr, 330Gb, and 330B belonging to the pixel block 510 or a change amount of the sum exceeds a predetermined threshold value, a request for reading of pixel signals SIG from four respective unit pixels belonging to the pixel block 510 is input to the arbiter 213.

3.2 Configuration Example of Pixel Block

Figure 20:
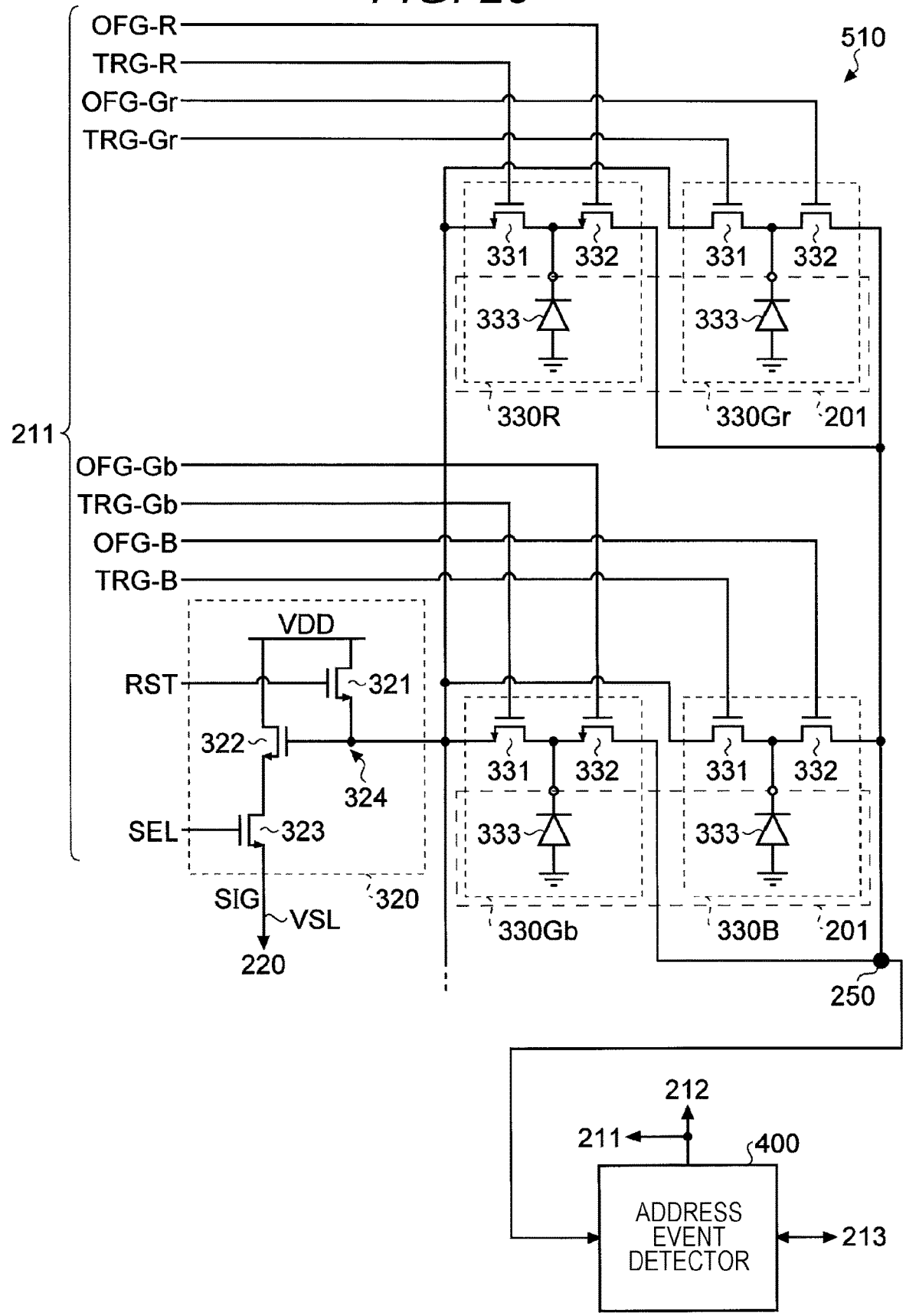
FIG. 20 is a circuit diagram illustrating a schematic configuration example of a pixel block according to the second embodiment.

Next, a configuration example of the pixel block will be described. FIG. 20 is a circuit diagram illustrating a schematic configuration example of the pixel block according to the second embodiment. As illustrated in FIG. 20, in the pixel block 510 according to the present embodiment, the plurality of address event detectors 400R, 400Gr, 400Gb, and 400B provided for the respective light receiving portions on a one-to-one basis in a similar configuration to that of the pixel block 310 described with reference to FIG. 11 in the first embodiment is replaced by one common address event detector 400. In addition, outputs of the respective light receiving portions 330R, 330Gr, 330Gb, and 330B are integrated by the integration unit 250 and input to the address event detector 400.

In the respective light receiving portions 330R, 330Gr, 330Gb, and 330B, OFG transistors 332 output electric signals generated by photoelectric conversion elements 333 according to control signals OFG. The electric signals (photoelectric currents) output from the light receiving portions 330R, 330Gr, 330Gb, and 330B are integrated by the integration unit 250 and supplied to the address event detector 400.

When firing of an address event is detected on the basis of the integrated electric signal, the address event detector 400 outputs a request to the arbiter 213. In this way, a request in units of pixel blocks is input to the arbiter 213.

When a request in units of pixel blocks is input, the arbiter 213 arbitrates requests from respective pixel blocks 510 and transmits a predetermined response to a pixel block 510 issuing the request on the basis of an arbitration result. The pixel block 510 receiving this response supplies a detection signal (address event detection signal) indicating presence of absence of firing of the address event to a driving circuit 211 and a signal processing unit 212.

The driving circuit 211 turns OFF the OFG transistors 332 in all the light receiving portions 330R, 330Gr, 330Gb, and 330B belonging to the pixel block 510 which is a supply source of the address event detection signal. In this way, supply of the photoelectric current from the light receiving portions 330R, 330Gr, 330Gb, and 330B in the pixel block 510 to the address event detector 400 is suspended.

Subsequently, the driving circuit 211 drives the transfer transistors 331 in all the light receiving portions 330R, 330Gr, 330Gb, and 330B belonging to the pixel block 510 in order by a transfer signal TRG. In this way, an electric charge accumulated in the photoelectric conversion element 333 are transferred in order from all the light receiving portions 330R, 330Gr, 330Gb, and 330B of the pixel block 510 to a floating diffusion layer 324 of a pixel signal generator 320. Then, pixel signals SIG of the plurality of respective unit pixels in the pixel block 510 are output in order from the pixel signal generator 320.

Since other configurations may be similar to those of the pixel block 310 described with reference to FIG. 11 in the first embodiment, a detailed description thereof will be omitted here. In addition, in the present embodiment, for example, a configuration example of the address event detector, a configuration example of a current-voltage conversion unit, a configuration example of a subtractor and a quantizer, and a configuration example of a column ADC are similar to those described with reference to FIG. 12 to FIG. 15 in the first embodiment, and thus a detailed description thereof will be omitted here.

3.3 Operation Example of Solid-State Image Pickup Device

Next, a description will be given of an operation of a solid-state image pickup device 200 according to the present embodiment. For example, an operation example of the solid-state image pickup device 200 according to the present embodiment may be similar to the operation example described with reference to FIG. 16 and FIG. 17 in the first embodiment. However, in the present embodiment, during a period in which control signals OFG-R, OFG-Gr, OFG-Gb, and OFG-B are at high levels (see the timings T0 to T2 of FIG. 16), the photoelectric currents output from the light receiving portions 330R, 330Gr, 330Gb, and 330B and integrated by the integration unit 250 are input to the address event detector 400. Therefore, in the present embodiment, the address event detector 400 detects presence or absence of firing of the address event in units of pixel blocks on the basis of the integrated photoelectric current, and transmits a request to the arbiter 213 in a case where firing of the address event is detected. Then, upon receiving a predetermined response from the arbiter 213, for example, the address event detector 400 raises a detection signal input to the driving circuit 211 and the signal processing unit 212 to a high level during a period from the timing T1 to the timing T2.

Since other operations may be similar to the operations described with reference to FIG. 16 and FIG. 17 in the first embodiment, a detailed description thereof will be omitted here.

3.4 Effects

As described above, in the second embodiment, similarly to the first embodiment, a set (pixel block 310) of a plurality (N) of unit pixels that receive wavelength components used to reconstruct a color is set as a unit (pixel block unit) for detecting presence or absence of firing of an address event, and pixel signals SIG are read in units of pixel blocks in a case where firing of the address event is detected in units of pixel blocks. In this way, when the address event fires in a unit pixel of a certain wavelength component, pixel signals SIG of all wavelength components used to reconstruct a color are synchronously read, and thus it is possible to reconstruct a correct color. As a result, it is possible to realize an event-driven type solid-state image pickup device and image pickup device capable of acquiring a color image in which a color is correctly reconstructed.

In addition, the second embodiment includes the address event detector 400 provided for the pixel block 510 on a one-to-one basis instead of the address event detector 400 provided for the light receiving portion 330 on a one-to-one basis. In this way, by adopting a configuration in which one address event detector 400 is shared by a plurality of light receiving portions 330 belonging to the same pixel block 510, it is possible to reduce a circuit scale when compared to a case where an individual address event detector 400 is provided for the light receiving portion 330.

Since other configurations, operations, and effects may be similar to those of the above embodiment, a detailed description thereof will be omitted.

4. Third Embodiment

Next, a solid-state image pickup device and an image pickup device according to a third embodiment of the present disclosure will be described in detail with reference to drawings. Note that in description below, a similar configuration, operation, and effect to those of the above-described embodiments will be cited, thereby omitting a repeated description thereof.

In the above-described embodiments, a case where each pixel block 310/510 includes a set of unit pixels receiving wavelength components used to reconstruct a color to reconstruct a correct color has been described by giving an example. Meanwhile, in the present embodiment, a description will be given of a case for reconstructing correct polarization information by giving an example.

Note that the polarization information is information related to polarization of incident light, and may correspond to, for example, information related to a polarization state of linear polarization, circular polarization, elliptic polarization, random polarization, etc., information related to a polarization direction in the case of linear polarization, information related to a major axis or a minor axis in the case of elliptic polarization, etc.

In the third embodiment, for example, a configuration example of the image pickup device, a configuration example of the solid-state image pickup device, a stacked configuration example of the solid-state image pickup device, a functional configuration example of the solid-state image pickup device, a configuration example of a pixel array portion, a configuration example of an address event detector, a configuration example of a current-voltage conversion unit, a configuration example of a subtractor and a quantizer, and a configuration example of a column ADC may be similar to those described in the first embodiment with reference to FIG. 1 to FIG. 4 and FIG. 12 to FIG. 15, and thus a detailed description is omitted here.

In addition, in the third embodiment, for example, detection of firing of address event and a configuration example of a pixel block may be similar to those described in the first embodiment with reference to FIG. 9, FIG. 10, and FIG. 11 or those described in the second embodiment with reference to FIG. 18, FIG. 19, and FIG. 20, and thus a detailed description is omitted here.

Further, for example, an operation example of the solid-state image pickup device 200 according to the third embodiment may be similar to the operation descried in the first or second embodiment with reference to FIG. 16 and FIG. 17, and thus a detailed description is omitted here.

However, in the present embodiment, for convenience of description, a reference numeral of the pixel block is set to 610. In addition, in the present embodiment, the number of light receiving portions 330 belonging to one pixel block 610 is set to three for a reason described later.

4.1 Example of Pixel Block

For example, the pixel block 610 according to the present embodiment includes a combination of unit pixels that receive polarization components used to reconstruct polarization information. For example, the polarization information can be obtained by fitting a sinusoid. For this reason, to reconstruct the polarization information, it is necessary to observe incident light using at least three polarizers having different rotation angles about an optical axis of a polarization axis.

Figure 21:
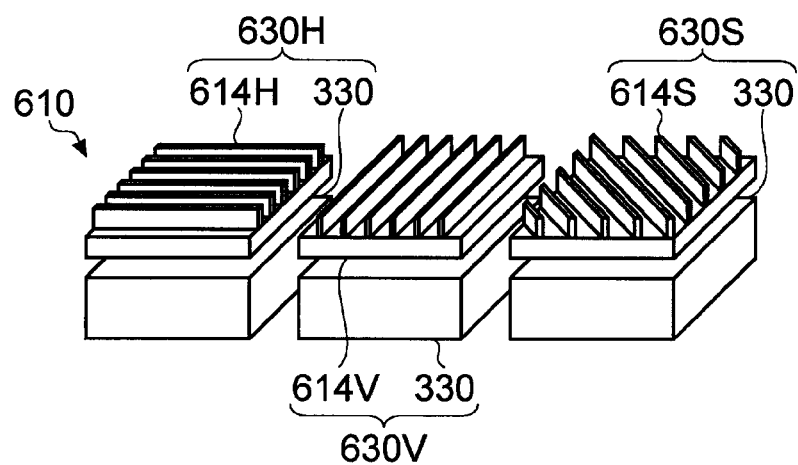
FIG. 21 is a schematic diagram illustrating an example of a pixel block according to a third embodiment.

Therefore, in the present embodiment, as in the pixel block 610 illustrated in FIG. 21, for example, three types of polarizers 614H, 614V, and 614S having different rotation angles about the optical axis of the polarization axis are used, and the three types of polarizers 614H, 614V, and 614S are disposed in predetermined repetitive patterns with respect to a plurality of light receiving portions 330 arrayed in a 2D lattice pattern. Further, in the present embodiment, a set of three unit pixels including the repetitive patterns, that is, the three types of polarizers 614H, 614V, and 614S, respectively, is grouped as one pixel block 610. Note that for simplicity of description, in FIG. 21, the pixel signal generator 320 and the address event detector 400 are omitted.

In a configuration illustrated in FIG. 21, for example, the polarizer 614H is a polarizer provided so that a polarization axis is parallel to a row direction of the light receiving portion 330. Therefore, a light receiving portion 630H, which is formed by combining the polarizer 614H and the light receiving portion 330, receives a polarization component parallel to the row direction of the light receiving portion 330 and generates an electric charge corresponding to the received light amount. In addition, for example, the polarizer 614V is a polarizer provided so that a polarization axis is parallel to a column direction of the light receiving portion 330. Therefore, a light receiving portion 630V, which is formed by combining the polarizer 614V and the light receiving portion 330, receives a polarization component parallel to the row direction of the light receiving portion 330 and generates an electric charge corresponding to the received light amount. Further, for example, the polarizer 614S is a polarizer provided so that a polarization axis is inclined at a predetermined inclination with respect to the row direction and the column direction of the light receiving portion 330. Therefore, a light receiving portion 630S, which is formed by combining the polarizer 614S and the light receiving portion 330, receives a polarization component inclination at the predetermined inclination with respect to the row direction and the column direction of the light receiving portion 330 and generates an electric charge corresponding to the received light amount.

Note that FIG. 21 illustrates a case where each pixel block 610 is grouped on the basis of the three polarizers 614H, 614V, and 614S arrayed in order in the row direction. However, the present disclosure is not limited thereto. For example, each pixel block 610 may be grouped on the basis of a pattern in which two of the three polarizers 614H, 614V, and 614S are disposed in the row direction and the remaining one is disposed in the column direction with respect to one of the other two.

4.2 Effects

As described above, in the third embodiment, instead of the wavelength selection elements (color filters 314R, 314Gr, 314Gb, 314B, etc.) used in the first and second embodiments, at least three polarizers 614H, 614V, and 614S having different rotation angles about the optical axis of the polarization axis are provided for the light receiving portion 330, and a set of unit pixels, each of which includes at least one of the polarizers 614H, 614V, and 614S, is grouped as one pixel block 610. In this way, similarly to the above-described embodiments, in a case where firing of an address event is detected in units of pixel blocks, pixel signals SIG are read in units of pixel blocks. Thus, when an address event fires in a unit pixel of a certain polarization component, pixel signals SIG of at least three polarization components used to reconstruct polarization information are synchronously read. In this way, it is possible to reconstruct correct polarization information on the basis of the pixel signals SIG read in units of pixel blocks. As a result, it is possible to realize an event-driven type solid-state image pickup device and image pickup device capable of acquiring image data including information as to whether or not incident light is natural light or reflected light reflected by an object, a water surface, etc., or about a polarization state of light from a light source, etc.

Since other configurations, operations, and effects may be similar to those of the above embodiments, a detailed description thereof will be omitted.

5. Fourth Embodiment

The third embodiment described above illustrates a case where three types of polarizers 614H, 614V, and 614S having different rotation angles about the optical axis of the polarization axis are disposed in predetermined repetitive patterns with respect to the plurality of light receiving portions 330 arrayed in the 2D lattice pattern, and a set of three unit pixels including the repetitive patterns, that is, the three types of polarizers 614H, 614V, and 614S, respectively, is grouped as one pixel block 610. On the other hand, in a fourth embodiment, four types of polarizers are disposed in predetermined repetitive patterns with respect to a plurality of light receiving portions 330 arrayed in a 2D lattice pattern, and a set of four unit pixels including the repetitive patterns, that is, the four types of polarizers, respectively, is grouped as one pixel block.

In the fourth embodiment, for example, a configuration example of the image pickup device, a configuration example of the solid-state image pickup device, a stacked configuration example of the solid-state image pickup device, a functional configuration example of the solid-state image pickup device, a configuration example of a pixel array portion, detection of firing of an address event, a configuration example of a pixel block, a configuration example of an address event detector, a configuration example of a current-voltage conversion unit, a configuration example of a subtractor and a quantizer, a configuration example of a column ADC, and an operation example of the solid-state image pickup device 200 may be similar to those described in the third embodiment, and thus a detailed description is omitted here. However, in the present embodiment, for convenience of description, a reference numeral of the pixel block is set to 710.

5.1 Example of Pixel Block

Figure 22:
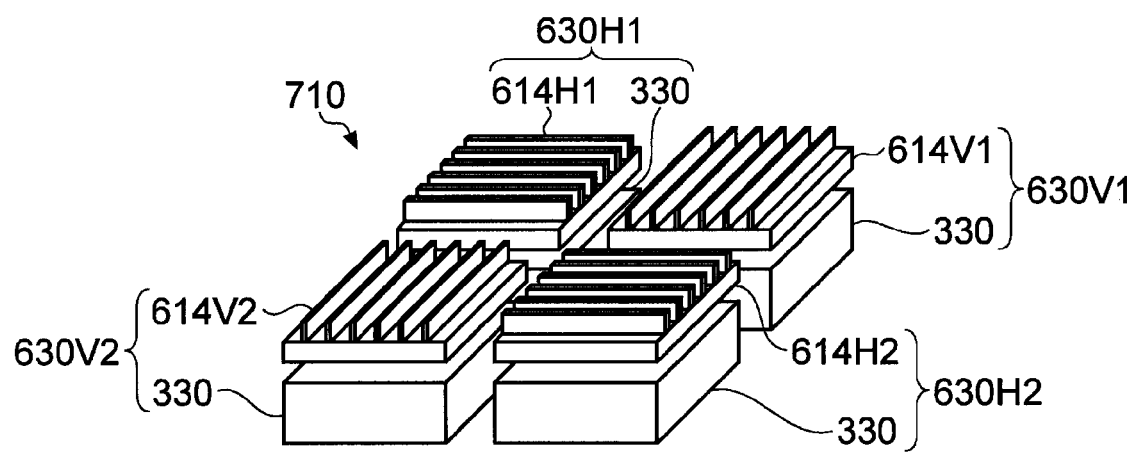
FIG. 22 is a schematic diagram illustrating an example of a pixel block according to a fourth embodiment.

FIG. 22 is a schematic diagram illustrating an example of a pixel block according to the fourth embodiment. Note that for simplicity of description, in FIG. 22, the pixel signal generator 320 and the address event detector 400 are omitted.

As illustrated in FIG. 22, the pixel block 710 according to the present embodiment has a configuration in which polarizers 614H1 and 614H2 provided so that polarization axes thereof are parallel to a row direction of a light receiving portion 330 and polarizers 614V1 and 614V2 provided so that polarization axes thereof are parallel to a column direction of the light receiving portion 330 are disposed in a predetermined array.

A light receiving portion 630H1 formed by combining the polarizer 614H1 and the light receiving portion 330 receives a polarization component parallel to the row direction of a light receiving portion 330 and generates an electric charge corresponding to the received light amount. A light receiving portion 630H2 formed by combining the polarizer 614H2 and the light receiving portion 330 receives a polarization component parallel to the row direction of the light receiving portion 330 and generates an electric charge corresponding to the received light amount. A light receiving portion 630V1 formed by combining the polarizer 614V1 and the light receiving portion 330 receives a polarization component parallel to the row direction of the light receiving portion 330 and generates an electric charge corresponding to the received light amount. A light receiving portion 630V2 formed by combining the polarizer 614V2 and the light receiving portion 330 receives a polarization component parallel to the row direction of the light receiving portion 330 and generates an electric charge corresponding to the received light amount.

Note that the polarization axis of the polarizer 614H1 and the polarization axis of the polarizer 614H2 may be parallel to each other or inclined at a predetermined angle. Similarly, the polarization axis of the polarizer 614V1 and the polarization axis of the polarizer 614V2 may be parallel to each other or inclined at a predetermined angle. However, it is presumed that the polarization axis of the polarizer 614V1 and the polarization axis of the polarizer 614V2 are inclined at a predetermined angle in a case where the polarization axis of the polarizer 614H1 and the polarization axis of the polarizer 614H2 are parallel to each other, and the polarization axis of the polarizer 614H1 and the polarization axis of the polarizer 614H2 are inclined at a predetermined angle in a case where the polarization axis of the polarizer 614V1 and the polarization axis of the polarizer 614V2 are parallel to each other.

5.2 Effects

As described above, even in a case where the number of unit pixels used to reconstruct polarization information is set to four, similarly to the third embodiment, when an address event fires in a unit pixel of a certain polarization component, pixel signals SIG of at least three polarization components used to reconstruct polarization information are synchronously read. Thus, it is possible to reconstruct correct polarization information on the basis of the pixel signals SIG read in units of pixel blocks. As a result, it is possible to realize an event-driven type solid-state image pickup device and image pickup device capable of acquiring image data including information as to whether or not incident light is natural light or reflected light reflected by an object, a water surface, etc., or about a polarization state of light from a light source, etc.

Since other configurations, operations, and effects may be similar to those of the above embodiments, a detailed description thereof will be omitted.

6. Fifth Embodiment

The wavelength selection element illustrated in the first or second embodiment may be combined with the polarizer illustrated in the third or fourth embodiment. That is, it is possible to adopt a configuration in which a polarization component used to reconstruct polarization information is acquired for each wavelength component used to reconstruct a color. In this way, it is possible to acquire a color image which includes information as to whether or not incident light is natural light or reflected light reflected by an object, a water surface, etc., or about a polarization state of light from a light source, etc. and in which a color is correctly reconstructed.

In the fifth embodiment, for example, a configuration example of the image pickup device, a configuration example of the solid-state image pickup device, a stacked configuration example of the solid-state image pickup device, a functional configuration example of the solid-state image pickup device, a configuration example of a pixel array portion, detection of firing of an address event, a configuration example of a pixel block, a configuration example of an address event detector, a configuration example of a current-voltage conversion unit, a configuration example of a subtractor and a quantizer, a configuration example of a column ADC, and an operation example of the solid-state image pickup device 200 may be similar to those described in the third embodiment, and thus a detailed description is omitted here. However, in the present embodiment, for convenience of description, a reference numeral of the pixel block is set to 810.

In addition, in description below, a case where the Bayer array is adopted as a color filter array and the polarizers 614H1, 614V1, 614V2, and 614H2 illustrated in the fourth embodiment are combined with this Bayer array is illustrated. However, the present disclosure is not limited thereto, and the polarizers 614H, 614V, and 614S illustrated in the third embodiment, the polarizers 614H1, 614V1, 614V2, and 614H2 illustrated in the fourth embodiment, etc. may be combined with another color filter array such as the X-Trans (registered trademark) type array or the Quad Bayer array.

6.1 Example of Pixel Block

Figure 23:
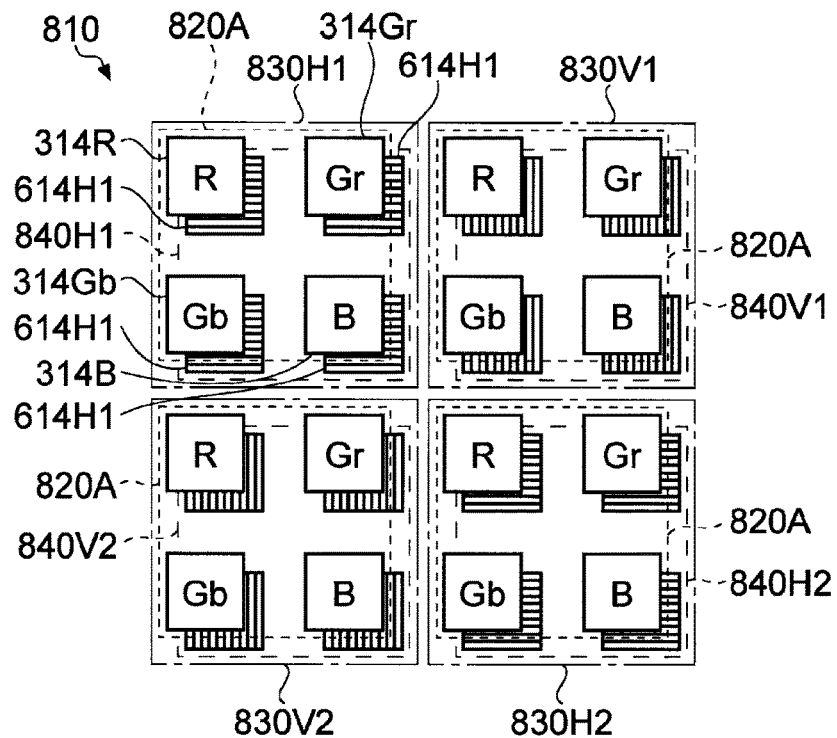
FIG. 23 is a schematic diagram illustrating an example of a pixel block according to a fifth embodiment.

FIG. 23 is a schematic diagram illustrating an example of the pixel block according to the fifth embodiment. Note that for simplicity of description, in FIG. 23, the light receiving portion 330, the pixel signal generator 320, and the address event detector 400 are omitted.

As illustrated in FIG. 23, the pixel block 810 according to the present embodiment has a configuration in which each of the polarizers 614H1, 614V1, 614V2, and 614H2 is combined with a unit pattern 820A of a Bayer array including 2×2 pixels of a color filter 314R of red (R) color, a color filter 314Gr of green (Gr) color, a color filter 314Gb of green (Gb) color, and a color filter 314B of blue (B) color.

More specifically, for example, in FIG. 23, in an upper left pixel group 830H1, a unit pattern 820A is combined with a polarizer group 840H1. The polarizer group 840H1 includes a total of four polarizers 614H1 corresponding to the respective color filters 314R, 314Gr, 314Gb, and 314B included in the unit pattern 820A on a one-to-one basis.

Similarly, in an upper right pixel group 830V1, a polarizer group 840V1 including a total of four polarizers 614V1 corresponding to the respective color filters 314R, 314Gr, 314Gb, and 314B on a one-to-one basis is combined with a unit pattern 820A. In addition, in a lower left pixel group 830V2, a polarizer group 840V2 including a total of four polarizers 614V2 corresponding to the respective color filters 314R, 314Gr, 314Gb, and 314B on a one-to-one basis is combined with a unit pattern 820A. Further, in a lower right pixel group 830H2, a polarizer group 840H2 including a total of four polarizers 614H2 corresponding to the respective color filters 314R, 314Gr, 314Gb, and 314B on a one-to-one basis is combined with a unit pattern 820A.

As described above, the pixel block 810 according to the present embodiment has unit pixels, the number (sixteen) of which is obtained by multiplying the number (four) of the color filters 314R, 314Gr, 314Gb, and 314B included in the unit pattern 820A by the number (four) of types of the polarizers 614H1, 614V1, 614V2, and 614H2 combined therewith.

6.2 Modification 1

Figure 24:
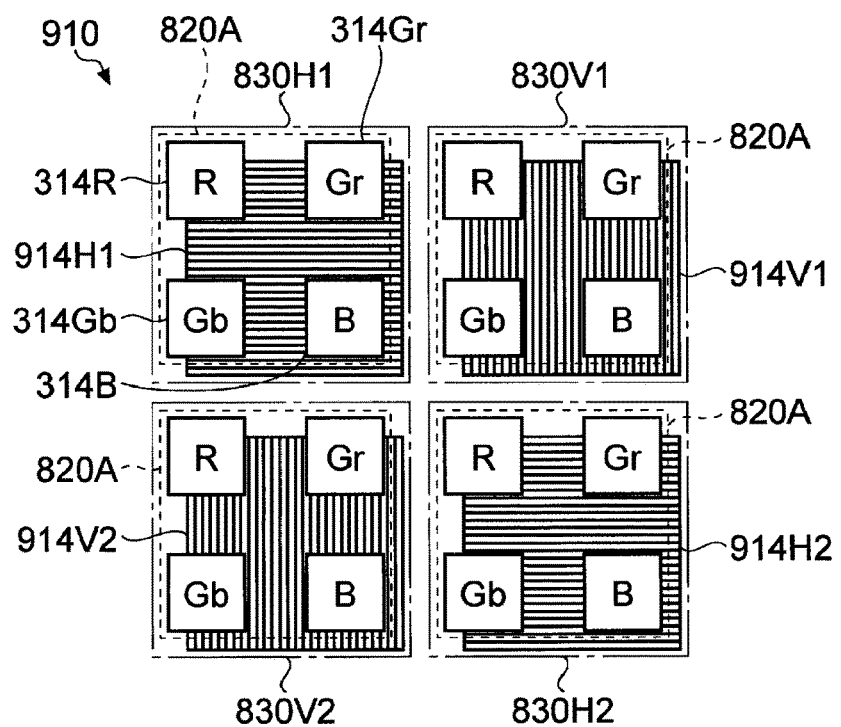
FIG. 24 is a schematic diagram illustrating an example of a pixel block according to Modification 1 of the fifth embodiment.

FIG. 24 is a schematic diagram illustrating an example of a pixel block according to Modification 1 of the fifth embodiment. FIG. 23 illustrates a case where the polarizers 614H1, 614V1, 614V2, and 614H2 are combined with the color filters 314R, 314Gr, 314Gb, and 314B included in the unit pattern 820A, respectively, on a one-to-one basis. However, the present disclosure is not limited to such a configuration. For example, as in a pixel block 910 illustrated in FIG. 24, each of the polarizer groups 840H1, 840V1, 840V2, and 840H2 combined with the four unit patterns 820A, respectively, may be configured by one polarizer 914H1, 914V1, 914V2, or 914H2.

6.3 Modification 2

Figure 25:
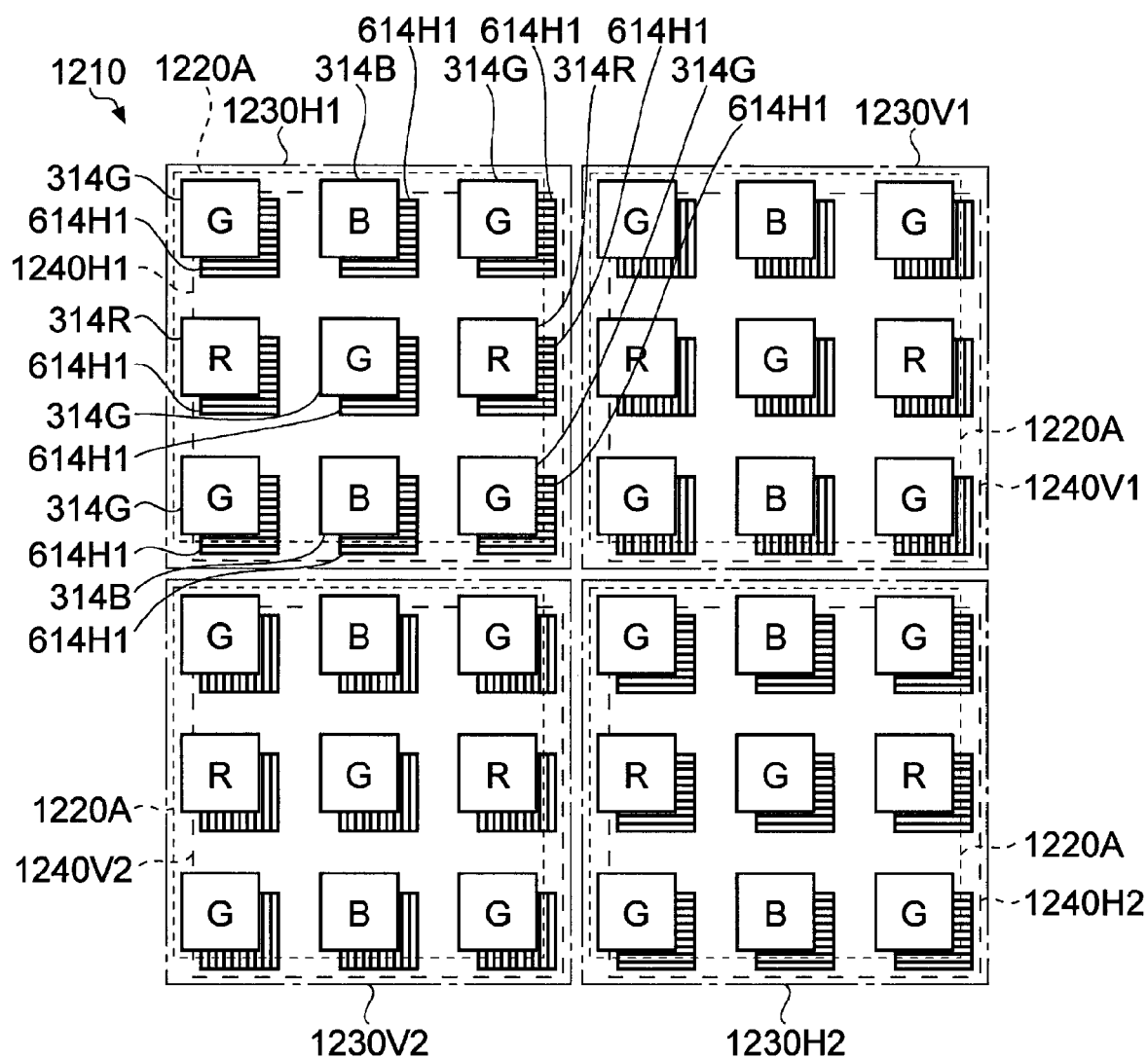
FIG. 25 is a schematic diagram illustrating an example of a pixel block according to Modification 2 of the fifth embodiment.

In addition, FIG. 25 is a schematic diagram illustrating an example of a pixel block according to Modification 2 of the fifth embodiment. Modification 2 illustrates a pixel block 1210 in a case where the X-Trans (registered trademark) type array is adopted as a color filter array. Note that in the present description, for clarity, a polarizer combined with the X-Trans (registered trademark) type array is set to the polarizers 614H1, 614V1, 614V2, and 614H2 illustrated in the fourth embodiment. In addition, in FIG. 25, for simplicity of description, the light receiving portion 330, the pixel signal generator 320, and the address event detector 400 are omitted.

As illustrated in FIG. 25, for example, the pixel block 1210 based on the X-Trans (registered trademark) type array includes a pixel group 1230H1 in which a polarizer group 1240H1 having nine polarizers 614H1 is combed with a unit pattern 1220A of the X-Trans (registered trademark) type array, a pixel group 1230V1 in which a polarizer group 1240V1 having nine polarizers 614V1 is combed with a unit pattern 1220A, a pixel group 1230V2 in which a polarizer group 1240V2 having nine polarizers 614V2 is combed with a unit pattern 1220A, and a pixel group 1230H2 in which a polarizer group 1240H2 having nine polarizers 614H2 is combed with a unit pattern 1220A.

6.4 Effects

As described above, by combining the wavelength selection element illustrated in the first or second embodiment with the polarizer illustrated in the third or fourth embodiment, it is possible to realize an event-driven type solid-state image pickup device or image pickup device capable of acquiring a color image which includes information as to whether or not incident light is natural light or reflected light reflected by an object, a water surface, etc., or about a polarization state of light from a light source, etc. and in which a color is correctly reconstructed.

Since other configurations, operations, and effects may be similar to those of the above embodiments, a detailed description thereof will be omitted.

7. Sixth Embodiment

In the above-described fifth embodiment, a case where a polarizer is combined with a color filter without changing an array thereof is illustrated. On the other hand, in a sixth embodiment, for example, the case of combining a color filter with a polarizer without changing a repetitive pattern thereof will be described by giving an example.

Note that in description below, a case where the Bayer array is adopted as a color filter array and the polarizers 614H1, 614V1, 614V2, and 614H2 illustrated in the fourth embodiment are combined with this Bayer array is illustrated. However, the present disclosure is not limited thereto, and the polarizers 614H, 614V, and 614S illustrated in the third embodiment, the polarizers 614H1, 614V1, 614V2, and 614H2 illustrated in the fourth embodiment, etc. may be combined with another color filter array such as the X-Trans (registered trademark) type array or the Quad Bayer array.

7.1 Example of Pixel Block

Figure 26:
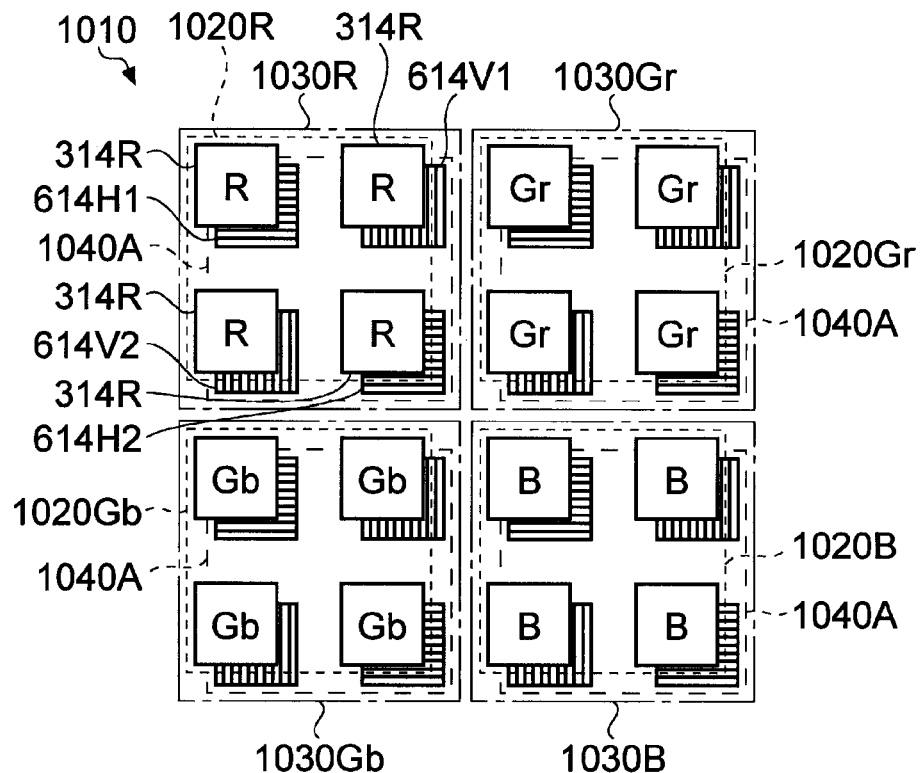
FIG. 26 is a schematic diagram illustrating an example of a pixel block according to a sixth embodiment.

FIG. 26 is a schematic diagram illustrating an example of the pixel block according to the sixth embodiment. Note that for simplicity of description, in FIG. 26, the light receiving portion 330, the pixel signal generator 320, and the address event detector 400 are omitted.

As illustrated in FIG. 26, a pixel block 1010 according to the present embodiment has a configuration in which each of the color filters 314R, 314Gr, 314Gb, and 314B included in the unit pattern of the Bayer array is divided into four parts. Note that the configuration in which each of the color filters 314R, 314Gr, 314Gb, and 314B included in the unit pattern of the Bayer array is divided into four parts corresponds to, for example, a color filter array similar to the Quad Bayer array illustrated in FIG. 7.

In FIG. 26, for example, in an upper left pixel group 1030R corresponding to color filters of red (R) color in a unit pattern of the Bayer array, a polarizer group 1040A including four polarizers 614H1, 614V1, 614V2, and 614H2 corresponding to color filters 314R, respectively, on a one-to-one basis is combined with a color filter group 1020R including a total of four color filters 314R of red (R) color of 2×2 pixels. For example, an array (repetitive pattern) of the polarizers 614H1, 614V1, 614V2, and 614H2 in the polarizer group 1040A may be similar to that of the above-described fourth embodiment.

Similarly, in an upper right pixel group 1030Gr corresponding to color filters of green (Gr) color in a unit pattern of the Bayer array, a polarizer group 1040A is combined with a color filter group 1020Gr including a total of four color filters 314Gr of green (Gr) color of 2×2 pixels. In addition, in a lower left pixel group 1030Gb corresponding to color filters of green (Gb) color in a unit pattern of the Bayer array, a polarizer group 1040A is combined with a color filter group 1020Gb including a total of four color filters 314Gb of green (Gb) color of 2×2 pixels. Further, in a lower right pixel group 1030B corresponding to color filters of blue (B) color in a unit pattern of the Bayer array, a polarizer group 1040A is combined with a color filter group 1020B including a total of four color filters 314B of blue (B) color of 2×2 pixels.

7.2 Modification 1

Figure 27:
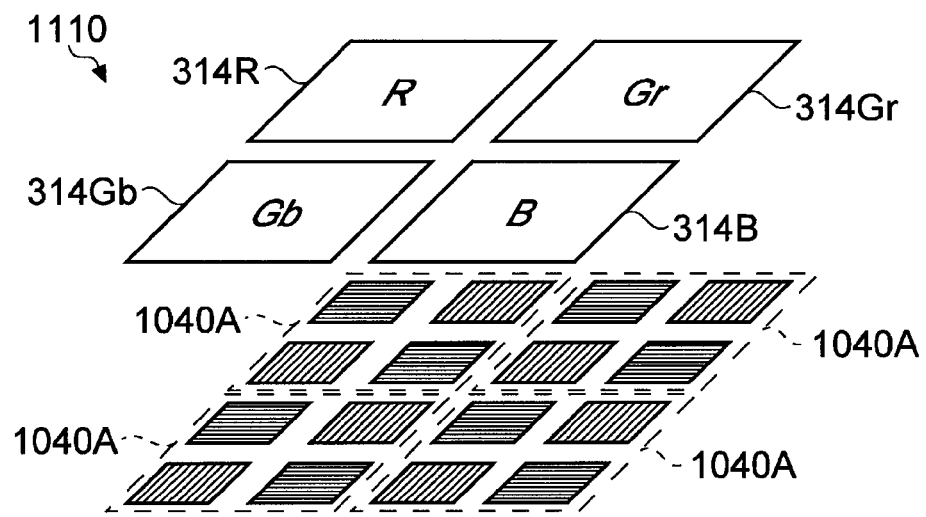
FIG. 27 is a schematic diagram illustrating an example of a pixel block according to Modification 1 of the sixth embodiment.

FIG. 27 is a schematic diagram illustrating an example of a pixel block according to Modification 1 of the sixth embodiment. FIG. 26 illustrates a case where each of color filters arrayed in a predetermined color filter array (for example, the Bayer array) is divided into parts, the number of which corresponds to the number of polarizers to be combined therewith. However, the present disclosure is not limited to such a configuration. For example, as in a pixel block 1110 illustrated in FIG. 27, each of the color filters 314R, 314Gr, 314Gb, and 314B may not be divided and a size thereof may be changed to combine the polarizer group 1040A with each of the color filters 314R, 314Gr, 314Gb, and 314B.

7.3 Modification 2

Figure 28:
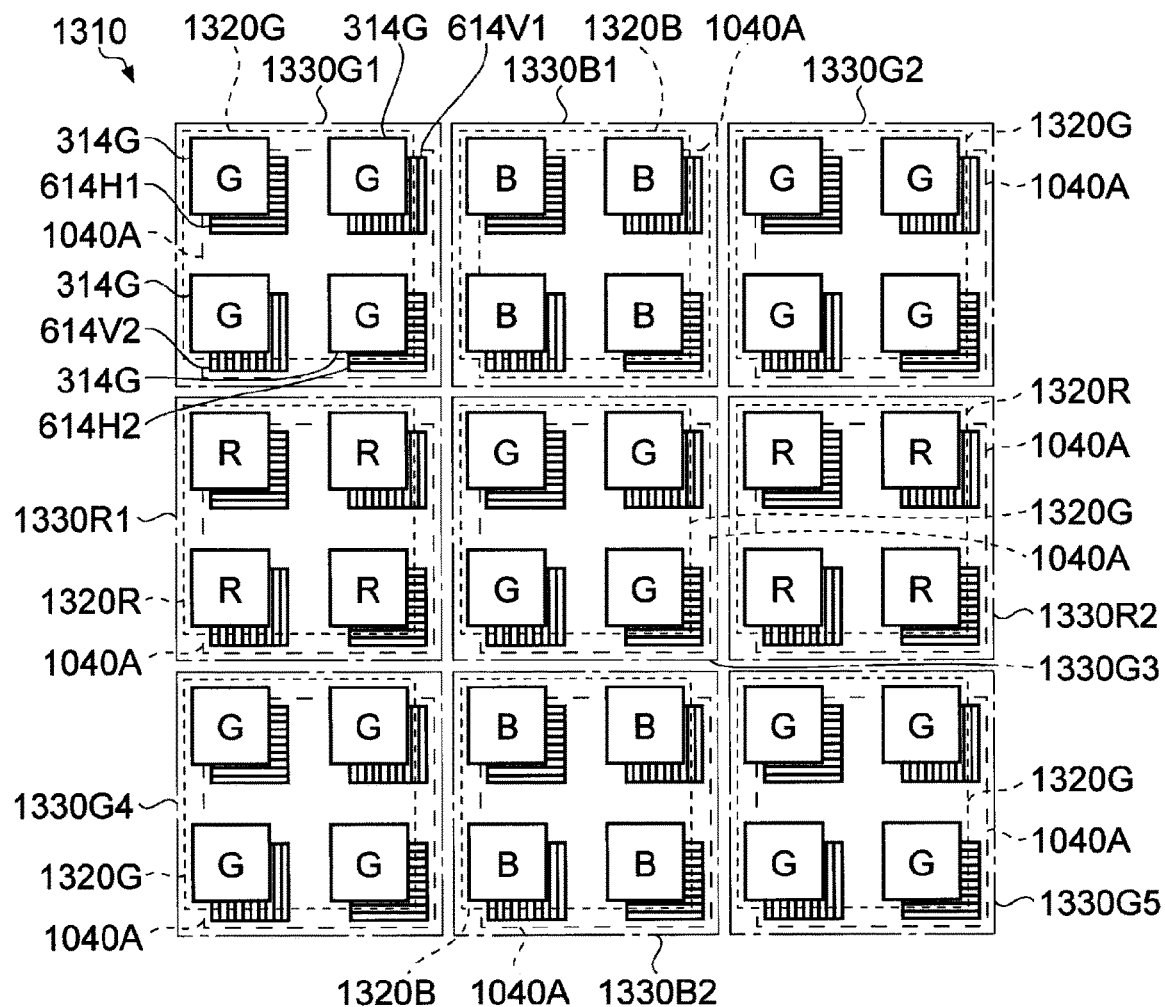
FIG. 28 is a schematic diagram illustrating an example of a pixel block according to Modification 2 of the sixth embodiment.

In addition, FIG. 28 is a schematic diagram illustrating an example of a pixel block according to Modification 2 of the sixth embodiment. Modification 2 illustrates a pixel block 1310 of a case where the X-Trans (registered trademark) type array is adopted as a color filter array. Note that in the present description, for clarity, a polarizer combined with the X-Trans (registered trademark) type array is set to the polarizers 614H1, 614V1, 614V2, and 614H2 illustrated in the fourth embodiment. In addition, in FIG. 28, for simplicity of description, the light receiving portion 330, the pixel signal generator 320, and the address event detector 400 are omitted.

As illustrated in FIG. 28, for example, the pixel block 1310 based on the X-Trans (registered trademark) type array has a configuration in which each of the color filters 314R, 314G, and 314B in a unit pattern 1220A of the X-Trans (registered trademark) type array is divided into parts, the number (four) of which corresponds to the number of polarizers 614H1, 614V1, 614V2, and 614H2 to be combined therewith.

Therefore, in FIG. 28, for example, in each of upper left, upper right, middle, lower left, and lower right pixel groups 1330G1, 1330G2, 1330G3, 1330G4, and 1330G5 corresponding to color filters of green (G) color in a unit pattern of the X-Trans (registered trademark) type array, a polarizer group 1040A including four polarizers 614H1, 614V1, 614V2, and 614H2 corresponding to color filters 314G, respectively, on a one-to-one basis is combined with a color filter group 1320G including the color filters 314G of 2×2 pixels.

Similarly, in each of upper middle and lower middle pixel groups 1330B1 and 1330B2 corresponding to color filters of blue (B) color in a unit pattern, a polarizer group 1040A is combined with a color filter group 1320B including a total of four color filters 314B of blue (B) color of 2×2 pixels. In addition, in each of middle left and middle right pixel groups 1330R1 and 1330R2 corresponding to color filters of read (R) color in a unit pattern, a polarizer group 1040A is combined with a color filter group 1320R including a total of four color filters 314R of read (R) color of 2×2 pixels.

7.4 Effects

As described above, even in a case where a color filter is combined with a polarizer without changing a repetitive pattern thereof, similarly to the fifth embodiment, it is possible to realize an event-driven type solid-state image pickup device or image pickup device capable of acquiring a color image which includes information as to whether or not incident light is natural light or reflected light reflected by an object, a water surface, etc., or about a polarization state of light from a light source, etc. and in which a color is correctly reconstructed.

Since other configurations, operations, and effects may be similar to those of the above embodiments, a detailed description thereof will be omitted.

8. Seventh Embodiment

In addition, for example, the polarizer illustrated in the third or fourth embodiment may be combined with the pixel block 310D having a structure in which the light receiving portions 330G, 330B, and 330R are provided for one pixel area 330G/B/R illustrated in the first embodiment with reference to FIG. 8.

Figure 29:
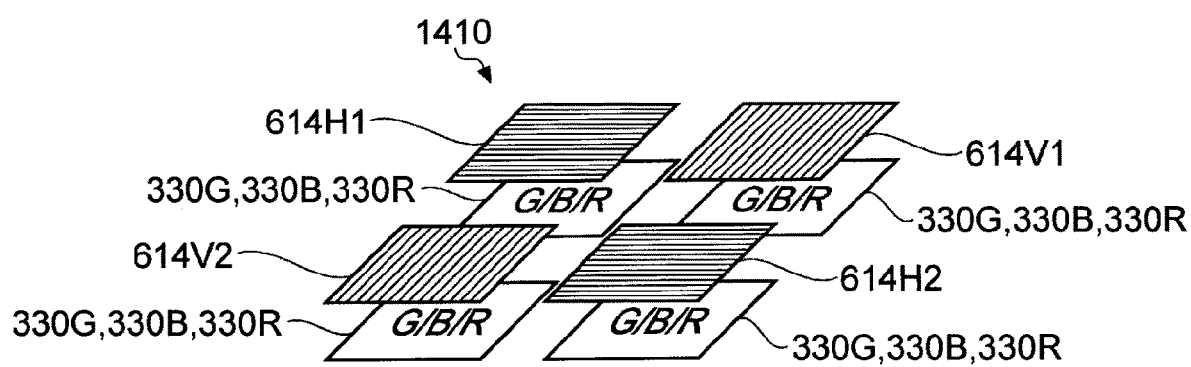
FIG. 29 is a schematic diagram illustrating an example of a pixel block according to a seventh embodiment.

FIG. 29 is a schematic diagram illustrating an example of a pixel block according to a seventh embodiment. Note that for simplicity of description, in FIG. 29, the light receiving portion 330, the pixel signal generator 320, and the address event detector 400 are omitted.

As illustrated in FIG. 29, in a case where the light receiving portions 330G, 330B, and 330R for receiving wavelength components used to reconstruct a color are concentrated in one pixel area 330G/B/R, the number of light receiving portions 330G/B/R grouped into a pixel block 1410 is determined by the number of polarizers included in a repetitive pattern. Therefore, for example, as illustrated in FIG. 29, in a case where the polarizers 614H1, 614V1, 614V2, and 614H2 illustrated in the fourth embodiment are combined, the number of light receiving portions 330G/B/R grouped into the pixel block 1410 is four.

8.1 Effects

As described above, even in a case where the light receiving portions 330G, 330B, and 330R for receiving wavelength components used to reconstruct a color are integrated in one pixel area 330G/B/R, for example, by combining with the polarizer illustrated in the third or fourth embodiment, it is possible to realize an event-driven type solid-state image pickup device or image pickup device capable of acquiring a color image which includes information as to whether or not incident light is natural light or reflected light reflected by an object, a water surface, etc., or about a polarization state of light from a light source, etc. and in which a color is correctly reconstructed.

Since other configurations, operations, and effects may be similar to those of the above embodiments, a detailed description thereof will be omitted.

Even though the embodiment of the present disclosure has been described above, the technical scope of the present disclosure is not limited to the above-described embodiment, and various modifications are possible without departing from a subject matter of the present disclosure. In addition, constituent elements according to different embodiments and modifications may be appropriately combined.

In addition, the effects of the respective embodiments described in this specification are merely examples and are not limited, and other effects may be provided.

Note that the present technology may adopt the following configurations.

(1)

A solid-state image pickup device including a plurality of light receiving portions, each of which receives light of a specific wavelength to generate an electric charge corresponding to an amount of the received light, a detector that detects a photoelectric current based on an electric charge generated in at least one of the plurality of light receiving portions, a generator that generates a voltage signal based on the electric charge generated in each of the plurality of light receiving portions, and a driving circuit that causes the generator to generate voltage signals based on electric charges generated in at least two of the plurality of light receiving portions, respectively, on the basis of a detection result of the photoelectric current by the detector.

(2)

The solid-state image pickup device according to item (1), in which the detector detects a current value of the photoelectric current or a change amount of the current value.

(3)

The solid-state image pickup device according to item (1) or (2), in which the plurality of light receiving portions is grouped into a pixel block for every at least two light receiving portions, the detector detects a photoelectric current based on the electric charge generated in the at least one of light receiving portions belonging to the pixel block for each pixel block, and the driving circuit causes the generator to generate the voltage signals based on respective electric charges generated in the light receiving portions belonging to the pixel block for each pixel block on the basis of the detection result of the photoelectric current for each pixel block by the detector.

(4)

The solid-state image pickup device according to item (3), in which the light receiving portions belonging to each pixel block receive lights of specific wavelengths different from each other.

(5)

The solid-state image pickup device according to item (4), in which each pixel block includes a combination of light receiving portions receiving wavelength components used to reconstruct a color of incident light, respectively.

(6)

The solid-state image pickup device according to any one of items (3) to (5), in which each pixel block includes a first light receiving portion receiving a wavelength component of red, a second light receiving portion receiving a wavelength component of green, and a third light receiving portion receiving a wavelength component of blue.

(7)

The solid-state image pickup device according to any one of items (3) to (6), in which the detector is provided for each of the plurality of light receiving portions, and the solid-state image pickup device further includes an integration unit that integrates the detection results output from a plurality of the detectors provided for the light receiving portions belonging to the pixel block for each pixel block.

(8)

The solid-state image pickup device according to any one of items (3) to (6), in which the detector is provided for each pixel block, the solid-state image pickup device further includes an integration unit that integrates the photoelectric currents output from the respective light receiving portions belonging to each pixel block for each pixel block, and the detector for each pixel block detects the photoelectric currents input through the integration unit.

(9)

The solid-state image pickup device according to any one of items (3) to (8), in which the plurality of light receiving portions is arrayed in a 2D lattice pattern according to a predetermined array.

(10)

The solid-state image pickup device according to item (9), in which the predetermined array corresponds to any one of a Bayer array, an X-Trans (registered trademark) type array, and a Quad Bayer array.

(11)

The solid-state image pickup device according to item (9) or (10), in which the predetermined array has a configuration in which a basic pattern obtained by combining the light receiving portions for respective wavelength components used to reconstruct a color of incident light in a predetermined arrangement is repeatedly disposed, and the plurality of light receiving portions is grouped into the pixel block for each basic pattern.

(12)

The solid-state image pickup device according to any one of items (1) to (11), in which each of the plurality of light receiving portions includes a photoelectric conversion element that receives light of the specific wavelength to generate the electric charge corresponding to the amount of the received light, and a first transistor that supplies the electric charge generated in the photoelectric conversion element to the detector as the photoelectric current according to control from the driving circuit.

(13)

The solid-state image pickup device according to item (12), in which each of the plurality of light receiving portions further includes a second transistor that transfers the electric charge generated in the photoelectric conversion element to the generator according to control from the driving circuit, and the generator includes a floating diffusion layer that accumulates the electric charge transferred from any one of the plurality of light receiving portions through the second transistor, a third transistor that discharges the electric charge accumulated in the floating diffusion layer according to control from the driving circuit, a fourth transistor that causes the voltage signal corresponding to an electric charge amount of the electric charge accumulated in the floating diffusion layer to appear on a predetermined signal line, and a fifth transistor that switches connection between the fourth transistor and the predetermined signal line according to control from the driving circuit.

(14)

The solid-state image pickup device according to any one of items (3) to (11), in which each of the plurality of light receiving portions further includes a photoelectric conversion element that receives light of the specific wavelength to generate the electric charge corresponding to the amount of the received light, a first transistor that supplies the electric charge generated in the photoelectric conversion element to the detector as the photoelectric current according to control from the driving circuit, and a second transistor that transfers the electric charge generated in the photoelectric conversion element to the generator according to control from the driving circuit, the generator includes a floating diffusion layer that accumulates the electric charge transferred from any one of the plurality of light receiving portions through the second transistor, a third transistor that discharges the electric charge accumulated in the floating diffusion layer according to control from the driving circuit, a fourth transistor that causes the voltage signal corresponding to an electric charge amount of the electric charge accumulated in the floating diffusion layer to appear on a predetermined signal line, and a fifth transistor that switches connection between the fourth transistor and the predetermined signal line according to control from the driving circuit, the detector detects presence or absence of firing of an event on the basis of the photoelectric current, and in a case where the detector detects firing of the event during a period in which the first transistor of each of the plurality of light receiving portions is controlled to be in an ON state, the driving circuit performs a control operation to turn OFF the first transistor of each of the light receiving portions belonging to a pixel block from which firing of the event is detected, performs a control operation to turn ON the fifth transistor, turns ON the third transistor for a certain period, and then performs a control operation to turn ON second transistors of the respective light receiving portions belonging to the pixel block for a certain period according to a predetermined order.

(15)

The solid-state image pickup device according to item (13) or (14), further including a conversion unit that converts the voltage signal appearing on the predetermined signal line into a digital value corresponding to a voltage value.

(16)

The solid-state image pickup device according to any one of items (1) to (15), in which each of the plurality of light receiving portions includes a photoelectric conversion element that receives light of the specific wavelength to generate the electric charge corresponding to the amount of the received light, and a wavelength selection element that limits a wavelength of the light incident on the photoelectric conversion element to the specific wavelength.

(17)

The solid-state image pickup device according to any one of items (1) to (16), further including a polarizer provided for each of the plurality of light receiving portions.

(18)

The solid-state image pickup device according to any one of items (3) to (11), further including a polarizer provided for each of the plurality of light receiving portions, in which polarizers provided for at least two light receiving portions belonging to each pixel block, respectively, have rotation angles about an optical axis of a polarization axis different from each other.

(19)

The solid-state image pickup device according to item (18), in which each pixel block includes light receiving portions, the number of which is obtained by multiplying the number of wavelength components used to reconstruct a color of incident light by the number of polarizers having the rotation angles about the optical axis of the polarization axis different from each other.

(20)

An image pickup device including a plurality of light receiving portions, each of which receives light of a specific wavelength to generate an electric charge corresponding to an amount of the received light, a detector that detects a photoelectric current based on an electric charge generated in at least one of the plurality of light receiving portions, a generator that generates a voltage signal based on the electric charge generated in each of the plurality of light receiving portions, and a driving circuit that causes the generator to generate voltage signals based on electric charges generated in at least two of the plurality of light receiving portions, respectively, on the basis of a detection result of the photoelectric current by the detector.

(21)

A solid-state image pickup device including a plurality of light receiving portions, each of which receives light in a specific polarization direction to generate an electric charge corresponding to an amount of the received light, a detector that detects a photoelectric current based on an electric charge generated in at least one of the plurality of light receiving portions, a generator that generates a voltage signal based on the electric charge generated in each of the plurality of light receiving portions, and a driving circuit that causes the generator to generate voltage signals based on electric charges generated in at least two of the plurality of light receiving portions, respectively, on the basis of a detection result of the photoelectric current by the detector.

(22)

The solid-state image pickup device according to item (21), in which the detector detects a current value of the photoelectric current or a change amount of the current value.

(23)

The solid-state image pickup device according to item (21) or (22), in which the plurality of light receiving portions is grouped into a pixel block for every at least two light receiving portions, the detector detects a photoelectric current based on an electric charge generated in at least one of light receiving portions belonging to the pixel block for each pixel block, and the driving circuit causes the generator to generate the voltage signals based on respective electric charges generated in the light receiving portions belonging to the pixel block for each pixel block on the basis of the detection result of the photoelectric current for each pixel block by the detector.

(24)

The solid-state image pickup device according to item (23), in which the light receiving portions belonging to each pixel block receive lights in specific polarization directions different from each other.

(25)

The solid-state image pickup device according to item (24), in which each pixel block includes a combination of light receiving portions receiving the lights in the specific polarization directions used to reconstruct polarization information of incident light, respectively.

(26)

The solid-state image pickup device according to any one of items (23) to (25), in which each pixel block includes a first light receiving portion receiving light in a first polarization direction, a second light receiving portion receiving light in a second polarization direction, and a third light receiving portion receiving light in a third polarization direction.

(27)

The solid-state image pickup device according to any one of items (23) to (26), in which the detector is provided for each of the plurality of light receiving portions, and the solid-state image pickup device further includes an integration unit that integrates the detection results output from a plurality of the detectors provided for the light receiving portions belonging to the pixel block for each pixel block.

(28)

The solid-state image pickup device according to any one of items (23) to (26), in which the detector is provided for each pixel block, the solid-state image pickup device further includes an integration unit that integrates the photoelectric currents output from the respective light receiving portions belonging to each pixel block for each pixel block, and the detector for each pixel block detects the photoelectric currents input through the integration unit.

(29)

The solid-state image pickup device according to any one of items (23) to (28), in which the plurality of light receiving portions is arrayed in a 2D lattice pattern according to a predetermined array.

(30)

The solid-state image pickup device according to item (29), in which the predetermined array has a configuration in which a repetitive pattern formed by combining the light receiving portions for the respective polarization directions used to reconstruct polarization information of incident light in a predetermined arrangement is repeatedly disposed, and the plurality of light receiving portions is grouped into the pixel block for each repetitive pattern.

(31)

The solid-state image pickup device according to any one of items (21) to (30), in which each of the plurality of light receiving portions includes a photoelectric conversion element that receives the light to generate the electric charge corresponding to the amount of the received light, and a first transistor that supplies the electric charge generated in the photoelectric conversion element to the detector as the photoelectric current according to control from the driving circuit.

(32)

The solid-state image pickup device according to item (31), in which each of the plurality of light receiving portions further includes a second transistor that transfers the electric charge generated in the photoelectric conversion element to the generator according to control from the driving circuit, and the generator includes a floating diffusion layer that accumulates the electric charge transferred from any one of the plurality of light receiving portions through the second transistor, a third transistor that discharges the electric charge accumulated in the floating diffusion layer according to control from the driving circuit, a fourth transistor that causes the voltage signal corresponding to an electric charge amount of the electric charge accumulated in the floating diffusion layer to appear on a predetermined signal line, and a fifth transistor that switches connection between the fourth transistor and the predetermined signal line according to control from the driving circuit.

(33)

The solid-state image pickup device according to any one of items (23) to (30), in which each of the plurality of light receiving portions further includes a photoelectric conversion element that receives the light to generate the electric charge corresponding to the amount of the received light, a first transistor that supplies the electric charge generated in the photoelectric conversion element to the detector as the photoelectric current according to control from the driving circuit, and a second transistor that transfers the electric charge generated in the photoelectric conversion element to the generator according to control from the driving circuit, the generator includes a floating diffusion layer that accumulates the electric charge transferred from any one of the plurality of light receiving portions through the second transistor, a third transistor that discharges the electric charge accumulated in the floating diffusion layer according to control from the driving circuit, a fourth transistor that causes the voltage signal corresponding to an electric charge amount of the electric charge accumulated in the floating diffusion layer to appear on a predetermined signal line, and a fifth transistor that switches connection between the fourth transistor and the predetermined signal line according to control from the driving circuit, the detector detects presence or absence of firing of an event on the basis of the photoelectric current, and in a case where the detector detects firing of the event during a period in which the first transistor of each of the plurality of light receiving portions is controlled to be in an ON state, the driving circuit performs a control operation to turn OFF the first transistor of each of the light receiving portions belonging to a pixel block from which firing of the event is detected, performs a control operation to turn ON the fifth transistor, turns ON the third transistor for a certain period, and then performs a control operation to turn ON second transistors of the respective light receiving portions belonging to the pixel block for a certain period according to a predetermined order.

(34)

The solid-state image pickup device according to item (32) or (33), further including a conversion unit that converts the voltage signal appearing on the predetermined signal line into a digital value corresponding to a voltage value.

(35)

The solid-state image pickup device according to any one of items (21) to (34), in which each of the plurality of light receiving portions includes a photoelectric conversion element that receives the light to generate the electric charge corresponding to the amount of the received light, and a polarizer that limits a polarization direction of the light incident on the photoelectric conversion element to the specific polarization direction.

(36)

The solid-state image pickup device according to any one of items (23) to (35), in which each of the plurality of light receiving portions has a configuration in which the light receiving portions for respective wavelength components used to reconstruct a color of incident light are arrayed in a 2D lattice pattern according to a predetermined array.

(37)

The solid-state image pickup device according to item (36), in which the predetermined array corresponds to any one of a Bayer array, an X-Trans (registered trademark) type array, and a Quad Bayer array.

(38)

The solid-state image pickup device according to item (36) or (37), further including a wavelength selection element provided for each of the plurality of light receiving portions to transmit the light for each wavelength component.

(39)

The solid-state image pickup device according to any one of items (36) to (38), in which each pixel block includes light receiving portions, the number of which is obtained by multiplying the number of polarizers used to reconstruct polarization information of incident light by the number of wavelength components used to reconstruct a color of the incident light.

(40)

An image pickup device including a plurality of light receiving portions, each of which receives light in a specific polarization direction to generate an electric charge corresponding to an amount of the received light, a detector that detects a photoelectric current based on an electric charge generated in at least one of the plurality of light receiving portions, a generator that generates a voltage signal based on the electric charge generated in each of the plurality of light receiving portions, and a driving circuit that causes the generator to generate voltage signals based on electric charges generated in at least two of the plurality of light receiving portions, respectively, on the basis of a detection result of the photoelectric current by the detector.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Image pickup device
110 Imaging lens
120 Recording unit
130 Controller
139, 209 Signal line
150, 250 Integration unit
200 Solid-state image pickup device
201 Light receiving chip
202 Detection chip
211 Driving circuit
212 Signal processing unit
213 Arbiter
220 Column ADC
230 ADC
300 Pixel array portion
310, 310A, 310B, 310C, 310D, 510, 610, 710, 810, 910, 1010, 1110, 1210, 1310, 1410 Pixel block
314R, 314Gr, 314Gb, 314B Color filter
320 Pixel signal generator
321 Reset transistor
322 Amplification transistor
323 Selection transistor
324 Floating diffusion layer
330, 330R, 330G, 330Gr, 330Gb, 330B, 630H, 630H1, 630H2, 630V, 630V1, 630V2, 630S Light receiving portion
330G/B/R Pixel area
331 Transfer transistor
332 OFG transistor
333 Photoelectric conversion element
400, 400R, 400Gr, 400Gb, 400B Address event detector
410 Current-voltage conversion unit
411, 413 N-type transistor
412 P-type transistor
420 Buffer
430 Subtractor
431, 433 Capacitor
432 Inverter
434 Switch
440 Quantizer
441 Comparator
450 Transfer unit 614H, 614H1, 614H2, 614V, 614V1, 614V2, 614S, 914H1, 914H2, 914 V1, 914V2 Polarizer
820A, 1220A Unit pattern
830H1, 830H2, 830 V1, 830V2, 1030R, 1030Gr, 1030Gb, 1030B, 1230H1, 1230H2, 1230V1, 1230V2, 1330R1, 1330R2, 1330G1 to 1330G5, 1330B1, 1330B2 Pixel group
840H1, 840H2, 840V1, 840V2, 1040A, 1240H1, 1240H2, 1240V1, 1240V2 Polarizer group
1020R, 1020Gr, 1020Gb, 1020B, 1320R, 1320G, 1320B Color filter group
SIG Pixel signal
VSL Vertical signal line

What is claimed is:

1. A solid-state image pickup device comprising:
a plurality of light receiving portions grouped into pixel blocks having at least two light receiving portions per pixel block, wherein each light receiving portion generates electric charge based on an amount of received light;
an integration node that integrates photoelectric currents output from a pixel block, wherein the photoelectric currents are generated based on electric charge generated in light receiving portions of a pixel block;
a detector provided for each pixel block and that detects the integrated photoelectric currents;
a generator that generates a-voltage signals based on the electric charge generated in each of the plurality of light receiving portions; and
a driving circuit that causes the generator to generate the voltage signals for a pixel block based on the integrated photoelectric currents detected by the detector.

2. The solid-state image pickup device according to claim 1, wherein the detector detects a current value of the integrated photoelectric currents or an amount of change in the current value.

3. The solid-state image pickup device according to claim 1, wherein light receiving portions of each pixel block receive different wavelengths of light.

4. The solid-state image pickup device according to claim 1, wherein each pixel block includes a first light receiving portion receiving a wavelength component of red, a second light receiving portion receiving a wavelength component of green, and a third light receiving portion receiving a wavelength component of blue.

5. The solid-state image pickup device according to claim 1, wherein the plurality of light receiving portions are arrayed in a 2D lattice pattern according to a predetermined array.

6. The solid-state image pickup device according to claim 5, wherein the predetermined array corresponds to one of a Bayer array, an X-Trans® type array, and a Quad Bayer array.

7. The solid-state image pickup device according to claim 5,
wherein the predetermined array has a configuration in which a pattern is repeated, and
wherein each pixel block has the pattern.

8. The solid-state image pickup device according to claim 1, wherein each of the plurality of light receiving portions includes:
a photoelectric conversion element that generates electric charge corresponding to the amount of received light, and
a first transistor that supplies the electric charge generated in the photoelectric conversion element to a respective detector as photoelectric current according to control from the driving circuit.

9. The solid-state image pickup device according to claim 8, wherein each of the plurality of light receiving portions further includes a second transistor that transfers the electric charge generated in the photoelectric conversion element to the generator according to control from the driving circuit, and
wherein the generator includes:
a floating diffusion layer that accumulates electric charge transferred from any one of the plurality of light receiving portions through the second transistor,
a third transistor that discharges the electric charge accumulated in the floating diffusion layer according to control from the driving circuit,
a fourth transistor that causes a voltage signal corresponding to an amount of the electric charge accumulated in the floating diffusion layer to appear on a predetermined signal line, and
a fifth transistor that switches connection between the fourth transistor and the predetermined signal line according to control from the driving circuit.

10. The solid-state image pickup device according to claim 9, further comprising:
a converter that converts the voltage signal appearing on the predetermined signal line into a digital value corresponding to a voltage value.

11. The solid-state image pickup device according to claim 1, wherein each of the plurality of light receiving portions further includes:
a photoelectric conversion element that generates electric charge corresponding to the amount of received light,
a first transistor that supplies the electric charge generated in the photoelectric conversion element to a respective detector as photoelectric current according to control from the driving circuit, and
a second transistor that transfers the electric charge generated in the photoelectric conversion element to the generator according to control from the driving circuit,
wherein the generator includes:
a floating diffusion layer that accumulates electric charge transferred from any one of the plurality of light receiving portions through the second transistor,
a third transistor that discharges electric charge accumulated in the floating diffusion layer according to control from the driving circuit,
a fourth transistor that causes a voltage signal corresponding to an amount of the electric charge accumulated in the floating diffusion layer to appear on a predetermined signal line, and
a fifth transistor that switches connection between the fourth transistor and the predetermined signal line according to control from the driving circuit,
wherein each detector detects presence or absence of firing of an event on a basis of the integrated photoelectric currents, and
wherein in a case where a detector detects firing of the event during a period in which the first transistor is controlled to be in an ON state, the driving circuit performs a control operation to turn OFF the first transistor of each of light receiving portions belonging to a pixel block from which firing of the event is detected, performs a control operation to turn ON the fifth transistor, turns ON the third transistor for a certain period, and then performs a control operation to turn ON the second transistor of each light receiving portions belonging to the pixel block for a certain period according to a predetermined order.

12. The solid-state image pickup device according to claim 1, wherein each of the plurality of light receiving portions includes:
    a photoelectric conversion element that generates electric charge corresponding to the amount of received light, and
    a wavelength selection element that limits a wavelength of light incident on the photoelectric conversion element to a specific wavelength or range of wavelengths.

13. The solid-state image pickup device according to claim 1, further comprising:
    a polarizer provided for each of the plurality of light receiving portions.

14. The solid-state image pickup device according to claim 1, further comprising:
    a polarizer provided for each of the plurality of light receiving portions,
    wherein polarizers provided for at least two light receiving portions of a pixel block have different rotation angles.

15. The solid-state image pickup device according to claim 14, wherein a number of light receiving portions in a pixel block is obtained by multiplying a number of wavelength components used to reconstruct a color of incident light by a number of polarizers with different rotation angles.

16. A solid-state image pickup device comprising:
    a plurality of light receiving portions grouped into pixel blocks having at least two light receiving portions per pixel block, wherein each light receiving portion generates electric charge based on an amount of received light;
    a plurality of detectors, each detector being provided for a respective light receiving portion and detecting photoelectric current that is generated based on electric charge generated in the respective light receiving portion;
    an integration node that integrates outputs of detectors of a pixel block;
    a generator that generates voltage signals based on the electric charge generated in each of the plurality of light receiving portions; and
    a driving circuit that causes the generator to generate the voltage signals for a pixel block based on the integrated outputs.

17. An image pickup device comprising:
    an imaging lens; and
    a solid-state image pickup device comprising:
        a plurality of light receiving portions grouped into pixel blocks having at least two light receiving portions per pixel block, wherein each light receiving portion generates electric charge based on an amount of received light;
        an integration node that integrates photoelectric currents output from a pixel block, wherein the photoelectric currents are generated based on electric charge generated in light receiving portions of a pixel block;
        a detector provided for each pixel block and that detects the integrated photoelectric currents;
        a generator that generates voltage signals based on the electric charge generated in each of the plurality of light receiving portions; and
        a driving circuit that causes the generator to generate the voltage signals for a pixel block based on the integrated photoelectric currents detected by the detector.

* * * * *